(12) United States Patent
Miyagaki et al.

(10) Patent No.: US 7,581,061 B2
(45) Date of Patent: Aug. 25, 2009

(54) DATA MIGRATION USING TEMPORARY VOLUME TO MIGRATE HIGH PRIORITY DATA TO HIGH PERFORMANCE STORAGE AND LOWER PRIORITY DATA TO LOWER PERFORMANCE STORAGE

(75) Inventors: Atsushi Miyagaki, Odawara (JP); Koji Yasuta, Hiratsuka (JP)

(73) Assignee: Hitachi, Ltd., Tokyo (JP)

( * ) Notice: Subject to any disclaimer, the term of this patent is extended or adjusted under 35 U.S.C. 154(b) by 472 days.

(21) Appl. No.: 11/640,324

(22) Filed: Dec. 18, 2006

(65) Prior Publication Data

US 2008/0104343 A1    May 1, 2008

(30) Foreign Application Priority Data

Oct. 30, 2006    (JP) .............................. 2006-294300

(51) Int. Cl.
G06F 12/00    (2006.01)
G06F 3/06    (2006.01)
G06F 13/00    (2006.01)
G06F 13/28    (2006.01)
G06F 11/00    (2006.01)

(52) U.S. Cl. ........................... 711/114; 711/4; 711/100; 711/111; 711/112; 711/147; 711/148; 711/154; 711/161; 711/162; 711/165; 711/117; 714/5; 714/6; 714/7

(58) Field of Classification Search ........................ None
See application file for complete search history.

(56) References Cited

U.S. PATENT DOCUMENTS

| 7,177,883 B2 * | 2/2007 | Yagawa .................... 707/104.1 |
| 7,475,206 B2 * | 1/2009 | Murotani et al. ............. 711/162 |
| 2004/0006572 A1 | 1/2004 | Hoshino et al. |
| 2005/0203964 A1 | 9/2005 | Matsunami et al. |

FOREIGN PATENT DOCUMENTS

| JP | 2003-303052 | 4/2002 |
| JP | 2004-295457 | 3/2003 |

* cited by examiner

*Primary Examiner*—Sanjiv Shah
*Assistant Examiner*—Marwan Ayash
(74) *Attorney, Agent, or Firm*—Stites & Harbison, PLLC; Juan Carlos A. Marquez, Esq.

(57) ABSTRACT

The storage control device of the present invention uses a temporary volume to move data rapidly between volume groups. The storage control device forms a plurality of volume groups by grouping volumes of the same performance. At least one or more temporary volumes are each pre-provided in the respective volume groups. The control section calculates and manages the priority levels of the respective data. The data with the highest priority level in the lower volume group are copied beforehand to the temporary volume in the upper volume group at a time when the data are not being accessed by the host. As a result, data can be moved rapidly when data migration is executed and so forth.

15 Claims, 24 Drawing Sheets

DATA MIGRATION USING TEMPORARY VOLUME TO MIGRATE HIGH PRIORITY DATA TO HIGH PERFORMANCE STORAGE AND LOWER PRIORITY DATA TO LOWER PERFORMANCE STORAGE

CROSS-REFERENCE TO RELATED APPLICATIONS

This application relates to and claims priority from Japanese Patent Application No. 2006-294300 filed on Oct. 30, 2006, the entire disclosure of which is incorporated herein by reference.

BACKGROUND OF THE INVENTION

1. Field of the Invention

The present invention relates to a storage control device and a data migration method for the storage control device.

2. Description of the Related Art

In government, government administration offices, local self-governing bodies, enterprises, and educational institutions, and so forth, for example, data are managed by using relatively large-scale storage systems to handle large quantities of data of a variety of types. Such storage systems are constituted by a storage control device such as a disk array device. The disk array device is constituted by providing a multiplicity of disk drives in the form of an array and provides a RAID (Redundant Array of Independent Disks)-based storage region, for example. At least one or more logical volumes (logical storage devices) are formed in physical storage regions provided by a disk drive group. The logical volumes are provided for programs that run on a host computer. The host computer (abbreviated as 'host' hereinbelow) is able to read and write data from and to the logical volumes by transmitting predetermined commands.

The amount of data to be managed is increasing on a daily basis in line with the advances of a computerized society. However, the value of data is not fixed and the evaluation of a lot of data drops as time elapses. A procedure for managing data in accordance with the value of data is known as ILM (Information Lifecycle Management), for example. Therefore, a data migration technology that changes the storage location of data in accordance with the value of the data has been proposed (Japanese Application Laid Open No. 2004-295457).

Meanwhile, a technology that automatically generates parameters that are used by tools for setting storage devices on the basis of storage device constitution information and policies that are established by the user has also been proposed (Japanese Application Laid Open No. 2003-303052).

In the conventional technology mentioned in Japanese Application Laid Open No. 2004-295457, when the re-arrangement of data has been determined, it is necessary to copy data constituting the migration target from the migration source to the migration destination after preparing a storage device for storing the data at the migration destination. Hence, although there is also variation depending on the total size of the data constituting the migration target, it takes a long time until the data migration is complete and user convenience is low.

SUMMARY OF THE INVENTION

The present invention was conceived in view of the above problems and an object of the present invention is to provide a storage control device and a data migration method for the storage control device that make it possible to improve user convenience with respect to data migration. A further object of the present invention is to provide a storage control device and a data migration method for the storage control device that makes it possible to improve user convenience and shorten the data migration time by moving at least a portion of the data in advance by using a temporary volume that is pre-prepared in each volume group before data migration is determined. Yet another object of the present invention is to provide a storage control device and a data migration method for the storage control device that makes it possible to improve user convenience which is able to automatically judge the value of data and move data in a relatively short time to a logical volume that depends on the value of the data. Further objects of the present invention will become evident from the following description of the embodiments.

In order to achieve the above object, the storage control device according to the present invention is a storage control device that comprises a plurality of storage drives for storing data used by a higher level device and a controller that controls data inputs and outputs between each of the storage drives and the higher level device, comprising: a plurality of logical volumes formed on the basis of physical storage regions of the respective storage drives; a plurality of volume groups each formed by grouping a plurality of each of the respective logical volumes; a priority level management section provided in the controller that detects and manages each of the priority levels of the data stored in the respective logical volumes on the basis of an access request issued by the higher level device; and a data migration section provided in the controller that moves the data between the respective volume groups on the basis of the respective priority levels managed by the priority level management section, wherein, among the respective logical volumes in the respective volume groups, at least one or more of the logical volumes is established as a temporary volume which is used for the migration of the data; and the data migration section uses the temporary volume to move migration target data between the respective volume groups beforehand.

In the embodiment of the present invention, the data migration section uses the temporary volume to move the migration target data between the respective volume groups before the migration of the migration target data has been determined.

In the embodiment of the present invention, the respective volume groups are ranked in accordance with the types of the respective logical volumes that constitute the respective volume groups.

In the embodiment of the present invention, the respective storage drives are classified as storage drives of a plurality of types each of which has a different performance, and the respective volume groups are ranked from a volume group with the highest rank to a volume group with the lowest rank in accordance with the type of the storage drive in which the respective logical volumes constituting the respective volume groups are provided.

In the embodiment of the present invention, the data migration section uses the temporary volume to move the migration target data between the respective volume groups so that the data of a high priority level are located in a volume group of a higher rank and data of a low priority level are located in a volume group of a lower rank.

In the embodiment of the present invention, the priority level management section detects and manages the priority levels of each of the data on the basis of the last time the higher level device accessed the respective data and the frequency with which the higher level device has accessed the respective data.

In the embodiment of the present invention, the priority level management section detects and manages the priority level for each of the respective data on the basis of the last time the higher level device accessed the respective data, the frequency with which the higher level device has accessed the respective data, and a priority level hold time that is preset for the respective data.

In the embodiment of the present invention, the data migration section selects data with the highest priority level among the respective data contained in a migration source volume group of a relatively low rank as the migration target data and copies the migration target data beforehand to the temporary volume contained in a migration destination volume group that is one rank higher.

In the embodiment of the present invention, the data migration section uses the migration target data copied to the temporary volume in the migration destination volume group to process an access request issued by the higher level device to the migration target data.

In the embodiment of the present invention, the data migration section manages the differences between the temporary volume in the migration destination volume group and a migration source logical volume in the migration source volume group with respect to the migration target data.

In the embodiment of the present invention, the data migration section reflects the differences to the migration source logical volume when the priority level of the migration target data is lowered by the priority level management section and copies other data set at the highest priority level in the migration source volume group to the temporary volume in the migration destination volume group.

In the embodiment of the present invention, the data migration section copies backup target data stored in a backup target logical volume that exists in a higher ranking volume group to a temporary volume in a lower ranking volume group beforehand.

In the embodiment of the present invention, the data migration section manages differences between the backup target logical volume and the temporary volume in the lower ranking volume group with respect to the backup target data and ends the backup by reflecting the differences in the temporary volume when an instruction to execute a backup is issued.

In the embodiment of the present invention, the controller controls each of (1) an access path management level that manages access points accessed by the higher level device, (2) a volume management level that manages the respective logical volumes, (3) an intermediate management level that manages management information related to the data stored in the volume management level and associations between the access points and the logical volumes.

In the embodiment of the present invention, the intermediate management level is constituted comprising a first level that manages the management information, a second level that manages the relationship between the access points and the first level, and a third level that manages the association between the first level and the volume management level.

In the embodiment of the present invention, at least one specified volume group among the respective volume groups is constituted by a virtual logical volume that is associated with another logical volume that exists in a plurality of different storage control devices; and the controller allocates cache memory in the controller when the virtual logical volume has been set to the online state and does not allocate the cache memory when the virtual logical volume has been set to the offline state.

In the embodiment of the present invention, the controller stores low priority level data in the specified virtual logical volumes associated with the other logical volumes in the specified other storage control device and, when the specified virtual logical volumes have all been set to the offline state, reports the fact that the supply of power to the specified other storage control device can be stopped or automatically stops the supply of power to the specified other storage control device.

In a data migration method according to another aspect of the present invention that uses a storage control device that comprises a plurality of storage drives for storing data used by a higher level device and a controller that controls data inputs and outputs between each of the storage drives and the higher level device, the controller executes: a step of generating each of a plurality of volume groups by grouping a plurality of each of a plurality of logical volumes formed on the basis of the physical storage regions of the respective storage drives according to the performance of the respective storage drives and setting at least one or more logical volumes among the respective logical volumes in the respective volume groups as a temporary volume for moving data; a step of detecting and managing the priority levels of the data stored in the respective logical volumes on the basis of an access request issued by the higher level device; and a step of using the temporary volume to move data between the respective volume groups before data migration is determined so that the high priority level data are stored in a volume group associated with a higher performance storage drive and the low priority level data are stored in a volume group associated with a lower performance storage drive.

All or some of the means, functions and steps of the present invention can sometimes be constituted as computer programs that are executed by a computer system. When all or part of the constitution of the present invention is constituted by a computer program, the computer program can be distributed by securing the program to various storage media or can be transmitted via a communication network, for example.

DESCRIPTION OF THE SPECIFIC EMBODIMENTS

Figure 1:
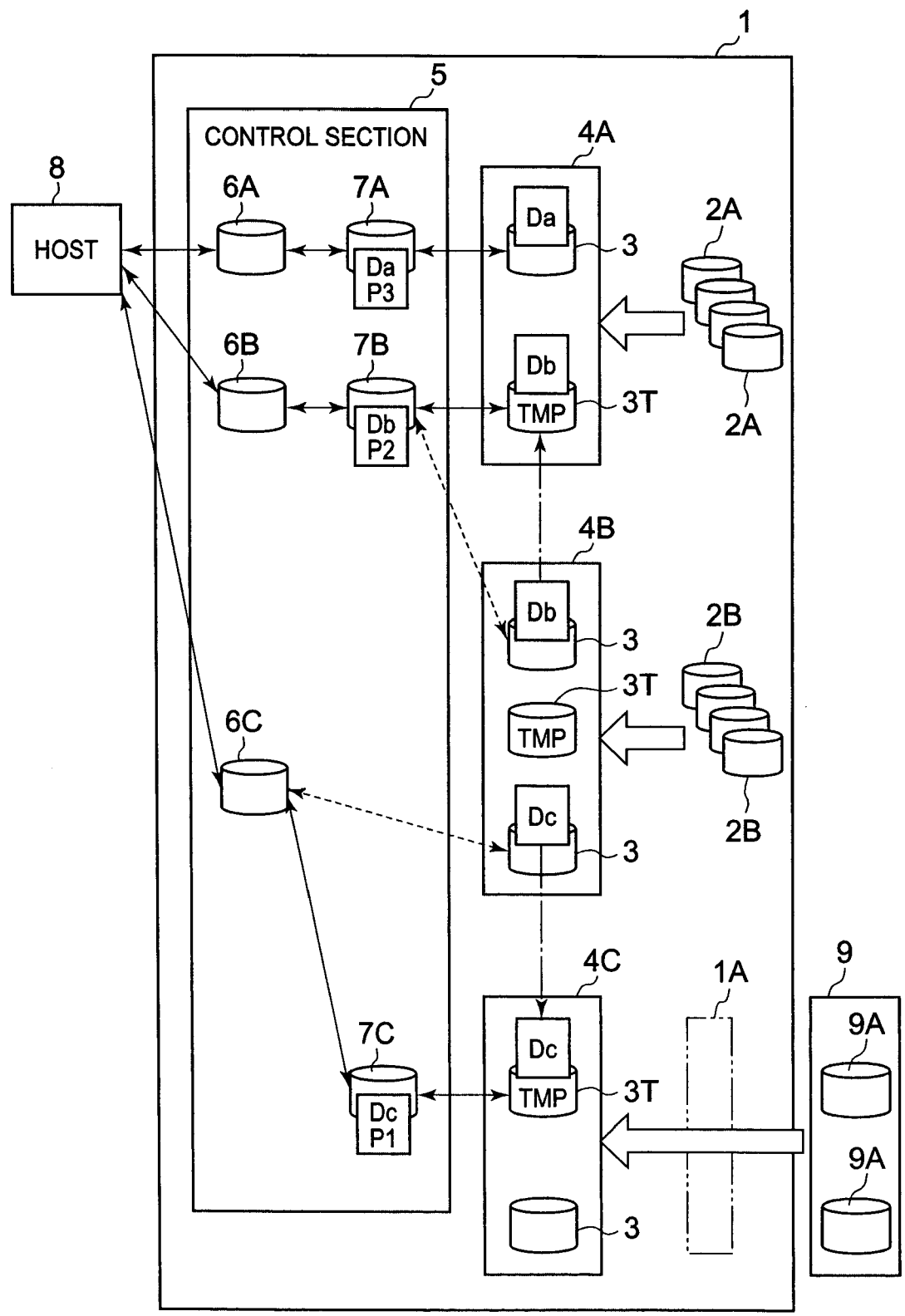
FIG. 1 is an explanatory diagram of an overview of an embodiment of the present invention.

FIG. 1 is a constitution explanatory diagram that provides an overview of an embodiment of the present invention. The storage control device 1 of this embodiment is connected to a host 8 which is a higher level device and an external storage control device 9 which is another storage control device. The host 8 is constituted as a computer device such as a mainframe computer or a server computer, for example. The external storage control device 9 is another storage control device that exists outside the storage control device 1 and comprises logical volumes 9A.

The storage control device 1 is constituted comprising a plurality of disk drives 2A and 2B, a plurality of logical volumes 3, a plurality of volume groups 4, and at least one control unit 5, for example.

The disk drives 2A and 2B are constituted as hard disk drives of a plurality of types of differing performance and reliability, for example. One disk drive 2A is constituted as a hard disk drive of a relatively high performance and the other disk drive 2B is constituted as a hard disk drive of a relatively low performance. Further, disk-type storage media need not necessarily be used for the disk drives 2A and 2B. The disk drives 2A and 2B can also use other storage devices other than hard disk drives. For example, a constitution that uses semiconductor memory devices (including flash memory devices), holographic memory, optical disk devices, magneto-optical disk devices, and magnetic tape devices or the like is also possible. When no particular distinction is made between the disk drives hereinbelow, disk drives 2A and 2B are sometimes referred to as disk drives 2.

The logical volumes 3 are logical storage regions that are provided in physical storage regions of the disk drives 2 and can also be called logical storage devices. As shown in the following embodiments, one or a plurality of logical volumes 3 can be generated by using a storage region that one or a plurality of disk drives 2 comprise. In this embodiment, the sizes of the respective logical volumes 3 are the same for the sake of the convenience of the invention.

A volume group 4 groups the logical volumes 3 according to the performance (or reliability) of the respective logical volumes 3. That is, each volume group 4 is constituted by a plurality of logical volumes 3 of the same type. For example, the storage control device 1 comprises a group 4A of high-performance logical volumes 3 that is established in the storage region of the high-performance disk drive 2A and a group 4B of low-performance logical volumes 3 that is established in the storage region of the low-performance disk drive 2B.

FIG. 1 shows one each of volume group 4A which comprises high-performance logical volumes 3 and volume group 4B which comprises low-performance logical volumes 3 for the sake of convenience in the invention. The constitution is not limited to the above constitution, however. A plurality of high-performance volume groups 4A and a plurality of low-performance volume groups 4B can also be provided and a medium-performance volume group which comprises logical volumes of medium performance can also be provided.

In addition, the logical volumes contained in another volume group 4C correspond to the logical volume 9A in the external storage control device 9. That is, whereas the respective logical volumes 3 in the volume groups 4A and 4B are provided in physical storage regions of the disk drives 2A and 2B respectively, the respective logical volumes 3 in the volume group 4C are constituted as virtual logical volumes that use the logical volumes 9A in the external storage control device 9 that is located outside the storage control device 1.

In other words, whereas the data in the respective logical volumes 3 that constitute the volume groups 4A and 4B are stored in the disk drives 2A and 2B respectively of the storage control device 1, the data in the respective logical volumes 3 that constitute the volume group 4C are stored in the logical volumes 9A in the external storage control device 9 that exists outside the storage control device 1. For example, by directly matching the respective logical volumes 3 in the volume group 4C with the respective logical volumes 9A in the external storage control device 9, the storage destination of the data can also be established as the logical volumes 9A in the external storage control device 9 (also called the external volumes 9A). Further, for example, by establishing an intermediate storage level 1A between the logical volumes 3 in the volume group 4C and the external volume 9A, the constitution of the external volume 9A can also be suitably changed and used. For example, one external volume 9A can also be divided and mapped to a plurality of logical volumes 3 or the storage regions of a plurality of external volumes 9A can be brought together and mapped to one or a plurality of logical volumes 3.

A control unit 5 which is a controller controls the overall operation of the storage control device 1. The control unit 5 is constituted as a computer device that comprises a microprocessor, a cache memory, a program memory, and a data I/O control circuit or the like, for example. The control unit 5 implements processing to input/output data to/from the logical volumes 3, data migration processing between the volume groups 4, and backup processing and so forth as a result of the microprocessor reading and executing a pre-stored program, for example.

The control unit 5 comprises access points 6A, 6B, and 6C and management volumes 7A, 7B, and 7C. The access points 6A, 6B, and 6C (when no particular distinction is made, they are referred to as access points 6) are points that are identified as access targets by the host 8 and can also be considered to be virtual volumes that are accessed by the host 8. More specifically, the access points 6 are constituted by matching identification information for specifying port numbers, LUN (Logical Unit Numbers) and access target data. The access points 6 are windows that are accessed by the host 8 and the places where data are actually stored are the logical volumes 3.

The management volumes 7A, 7B, and 7C (when no particular distinction is made, they are referred to as 'management volumes 7') are information for managing the relationships of correspondence between the access points 6 and logical volumes 3 and the priority levels of the data stored in the logical volumes 3. The access points 6 and logical volumes 3 are linked by the management volumes 7.

An example of the method for calculating the priority level will be made clear by the following embodiments. To describe this first in simple terms, the control unit 5 calculates the frequency with which the host 8 accesses the respective data, the times that the host 8 ultimately updates the respective data, and the times (ultimate lead times) at which the host 8 ultimately accesses the respective data, and calculates the priority levels of the respective data by considering priority level hold times. The priority hold times are the times at which the priority level established for the data is maintained. The priority level established for the data is not changed until the priority level hold time has elapsed even when other parameters (access frequency, last update time, and last access time) have changed. Although default values are prepared for the priority level hold times, optional times can be set by the user.

The priority levels of the data stored in the logical volumes 3 are managed by the management volumes 7. In other words, the priority levels of the data stored in the logical volumes 3 are separated from the data units and managed within the management volumes 7. Hence, the priority levels of the data can be changed without changing the data stored in the logical volumes 3 simply by rewriting the priority levels in the management volumes 7. Further, the logical volumes 3 accessed by the host 8 can be switched without the knowledge of the host 8 simply by rewriting the relationships between the access points 6 and the logical volumes 3 in the management volumes 7.

Let us now turn our attention once again to the volume groups 4. Each of the volume groups 4 is provided with at least one or more temporary volumes 3T. In other words, among the plurality of logical volumes 3 that constitute the respective volume groups 4, at least one or more logical volumes 3 are always used as temporary volumes 3T. That is, it is probable that any of the logical volumes 3 in the volume groups 4 will be used as temporary volumes 3T.

The temporary volumes 3T are temporary storage regions that are used for data migration between the respective volume groups 4. Data are able to migrate in an upward or downward direction. The upward direction signifies the direction in which data are stored in higher performance logical volumes 3 and the downward direction signifies the direction in which data are stored in lower performance logical volumes 3. As mentioned earlier, the respective volume groups 4 are ranked into a plurality of levels from the highest rank volume group 4A to the lowest rank volume group 4C in accordance with their performance and reliability and so forth.

The host 8 normally uses the highest ranked logical volume 3 to perform a variety of task processing. Task processing can include database processing, electronic mail processing, and customer management processing and so forth, for example. Data Da that are currently used by the host 8 are stored in the logical volume 3 in the volume group 4A. Suppose that the priority level of the data Da is "3". In this embodiment, the higher the value, the higher the priority level is. That is, data of priority level "3" have a higher value than data of priority level "2".

Data Db are stored in a logical volume 3 in the volume group 4B located one rank below the volume group 4A. The priority level of data Db is "2" and also has the highest priority level in the volume group 4B. The host 8 is able to access the data Db that are stored in the logical volume 3 in the volume group 4B from the access point 6B via the management volume 7B.

When the host 8 is not accessing the data Db, the control unit 5 copies the data Db from the logical volume 3 in the volume group 4B to the temporary volume 3T in the volume group 4A. The control unit 5 copies the data Db while managing the differences between the migration source logical volume 3 and the migration destination temporary volume 3T. The control unit 5 then rewrites the information of the management volume 7B and connects the access point 6B and the temporary volume 3T in the volume group 4A.

The access request from the host 8 to the data Db is processed as follows. In the case of the write request, the write data are written to the migration destination temporary volume 3T. The address of the write data written to the temporary volume 3T is managed by difference management information such as a differential bitmap. In the case of a read request for data that have already been copied to the temporary volume 3T, the data requested by the host 8 are read from the temporary volume 3T. In the case of a read request for data that has not yet been copied to the temporary volume 3T, the access point 6B and the logical volume 3 in the volume group 4B are re-connected and the data requested by the host 8 are read from the logical volume 3 in the volume group 4B.

Thus, the data Db of the highest priority level in the lower volume group 4B are copied beforehand to the temporary volume 3T in the upper volume group 4A by using the time during which the data Db are not being accessed by the host 8. An access request from the host 8 is then processed by using the higher performance temporary volume 3T.

In cases where the re-arrangement of data is performed on the basis of the priority levels of the respective data, the probability that the data Db of the highest priority level in the lower volume group 4B will migrate to the upper volume group 4A is high. Because the data Db has already been copied to the temporary volume 3T in the upper volume group 4A, the control unit 5 rewrites the information of the management volume 7B to make the storage destination of the data Db the volume 3T. As a result of the storage destination being officially changed, the temporary volume 3T is treated as a primary logical volume.

Among the data in the upper volume group 4A, data of the lowest priority level are made to migrate to the volume group 4B which is one volume group below. After the data migration is complete, the logical volume 3 in which data of the lowest priority level are stored is employed as a temporary volume 3T. Thus, in each volume group 4, the logical volume 3 that stores the data of the lowest priority level is used as the new temporary volume 3T.

A case where the priority level of the data Db is changed to a low level after copying the data Db to a temporary volume 3T in the upper volume group 4A may also be considered. In cases where the data Db which has been copied to the temporary volume 3T of the migration destination volume group 4A does not have the highest priority level in the migration source volume group 4B, the preliminary arrangement of data Db has failed. In this case, the control unit 5 reflects the differences managed by the migration destination temporary volume 3T to the migration source logical volume 3. The temporary volume 3T in the migration destination volume group 4A is used as is as a temporary volume and employed as a migration destination volume for other data.

In another respect, data can also be made to migrate from top to bottom using the temporary volume 3T. For example, when data Dc of priority level "1" is considered, in cases where the host 8 is not accessing data Dc, the data Dc can be pre-copied to the temporary volume 3T in the lower volume group 4C. The control unit 5 copies data Dc from the logical volume 3 to the temporary volume 3T while managing the difference between the migration source logical volume 3 and the migration destination temporary volume 3T.

When the host 8 issues a write request to the data Dc, the control unit 5 writes write data to the migration source logical volume 3 and manages the address of the write data by means of a differential bitmap or the like. When a read request for data Dc is issued by the host 8, the control unit 5 reads the data from the migration source logical volume 3 and transmits the data to the host 8.

When the re-arrangement of the data is performed on the basis of the priority level of the respective data, the probability that migration to the lower volume group 4C will be determined for the data Dc of the lowest priority level in the volume group 4B is high. Because the data Dc has already been copied to the temporary volume 3T in the lower volume group 4C, the control unit 5 is able to complete the migration of data Dc simply by reflecting the differences from the time copying is started until data re-arrangement is executed in the temporary volume 3T. After the migration of data Dc is complete, the control unit 5 rewrites the information of the management volume 7C to connect the access point 6C and the temporary volume 3T in the volume group 4C. The temporary volume 3T is used as a storage destination volume of the data Dc. The data of the highest priority level in the lowest volume group 4C migrates to the volume group 4B that is one volume group higher. Hence, the logical volume 3 in which the data are stored is used as the new temporary volume 3T.

In FIG. 1, one each of the temporary volumes 3T are shown in the respective volume groups 4 due to space limitations. However, as mentioned earlier, the constitution may also be such that a plurality of temporary volumes which are an upper temporary volume which is to be used for upward migration from bottom to top and a lower temporary volume which is to be used for downward migration from top to bottom are provided in the respective volume groups 4. Further, because there is no need to provide an upper temporary volume in the highest volume group 4A, only one temporary volume need be provided.

Let us know consider volume group 4C. The respective logical volumes 3 in the volume 4C are made to correspond with the respective logical volumes 9A in the external storage control device 9. When all the logical volumes 3 in the volume 4C are then set to an offline state, the control unit 5 is able to report the fact that the supply of power to the external storage control device 9 can be stopped to the user. Alternatively, when the control unit 5 is able to control the power supply device that supplies power to the external storage control device 9, the control unit 5 is also able to automatically stop the supply of power to the external storage control device 9.

As mentioned earlier, in this embodiment, the volume group 4C is constituted by the external volumes 9A and the number of volumes 3 that are set to the online state can be set. An online-state volume signifies a volume that is placed in a state where same is capable of processing an access request from the host 8 directly.

A resource that is required for access processing such as a cache memory is allocated to the online-state logical volumes 3. In contrast, the resources required for access processing such as the cache memory are not allocated to the offline-state logical volumes 3. Hence, the running costs of the storage control device 1 can be reduced by preventing the futile allocation of resources to the logical volumes 3 that are not being accessed by the host 8. The number of logical volumes 3 in the online state in the volume group 4C is preset. When there exist logical volumes 3 for which the number of volumes that are able to enter the online state is exceeded, the logical volumes 3 that store data of a low priority level in the volume group 4C are set to the offline state.

According to the embodiment of this constitution, at least one or more temporary volumes 3T are created beforehand in the respective volume groups 4 and the temporary volumes 3T are used to implement data migration between the respective volume groups 4. Hence, in comparison with a case where a migration destination volume is generated when the time to perform data migration has come, user convenience can be raised by shortening the time required for the data migration.

In this embodiment, data of the migration target are copied to the temporary volumes 3T before data migration is determined. Hence, when data migration is determined, data can be caused to migrate immediately simply by establishing the relationships of correspondence between the access points 6 and logical volumes 3 and reflecting the differences, and user convenience can be raised by shortening the data migration time.

In this embodiment, the values of the respective data are judged on the basis of the priority levels thereof and the storage destinations of the data are changed in accordance with the priority levels of the respective data. Hence, data can be stored in suitable logical volumes 3 in accordance with the values of the data and the disk drives 2 can be used effectively. That is, a situation where the high-performance logical volumes 3 that are constituted on the basis of the high-performance disk drives 2A are occupied by data of low value can be prevented and data of a high usage value can be stored in high-performance logical volumes 3 by the user. The embodiment will be described in more detail hereinbelow.

First Embodiment

Figure 2:
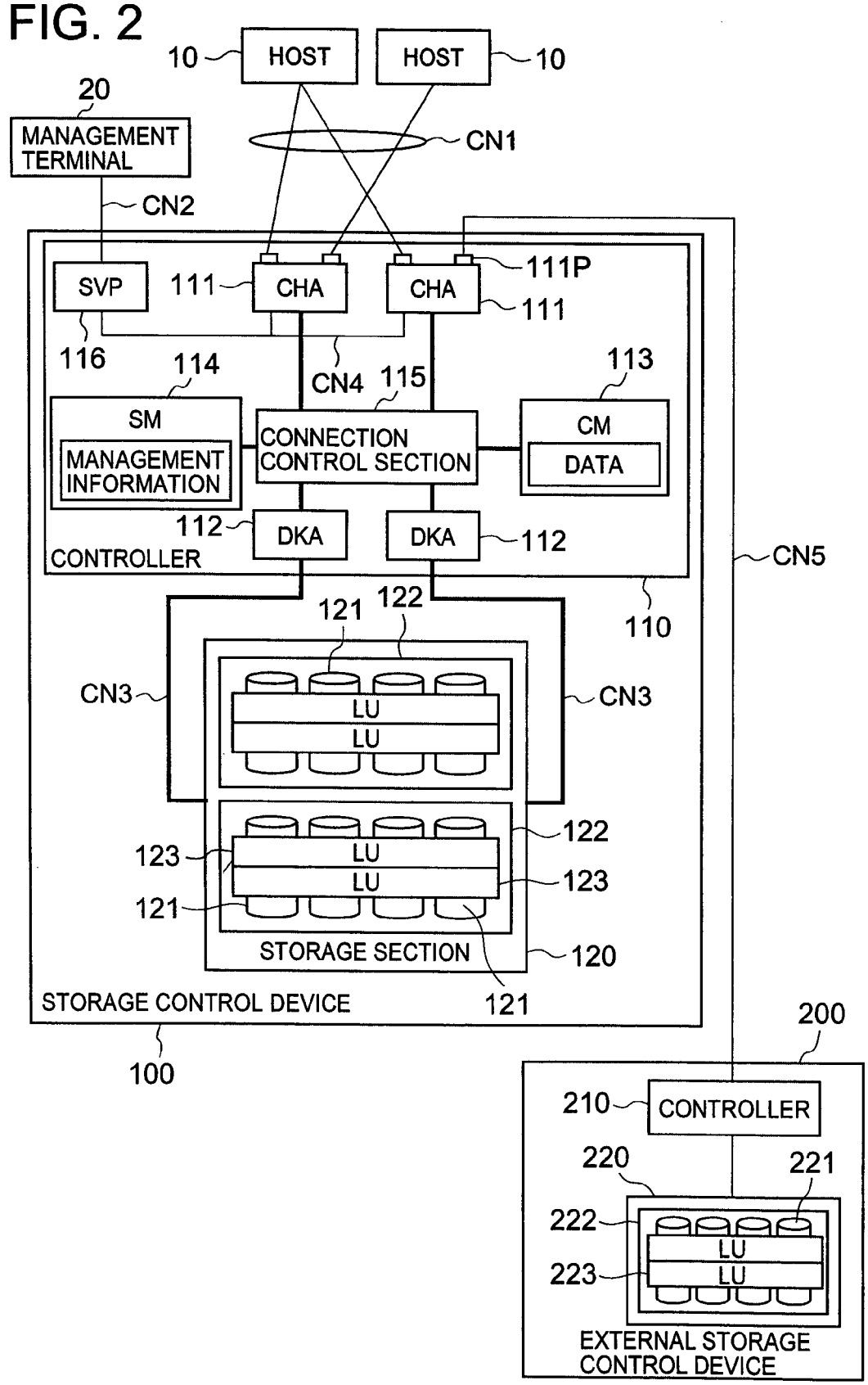
FIG. 2 is a block diagram of the constitution of the storage control device.

FIG. 2 is a block diagram that shows the constitution of the important parts of the storage control device of this embodiment. A host 10 is, for example, a computer device that comprises information processing resources such as a CPU (Central Processing Unit) and memory and so forth, and is constituted as a personal computer, work station, server computer, or mainframe computer, or the like, for example.

The host 10 comprises a communication control section for accessing a storage control device 100 via a communication network CN1, and an application program such as database software, for example.

Depending on the case, a LAN (Local Area Network), a SAN (Storage Area Network), the Internet, a dedicated line, a public line, or the like, for example, can be suitably used as the communication network CN1. Data communications via a LAN are performed in accordance with the TCP/IP protocol, for example. When the host 10 is connected to the storage control device 100 via the LAN, the host 10 requests data inputs and outputs in file units by specifying the file name. When the host 10 is connected to the storage control device 100 via the SAN, the host 10 requests data inputs and outputs in block units in accordance with the fiber channel protocol.

A management terminal 20 is a computer device for managing the constitution and so forth of the storage control device 100 and can be operated by the user such as the system manager, for example. The management terminal 20 is connected to the storage control device 100 via the communication network CN2. The user is able to set the priority level hold times of the respective data via the management terminal 20.

The storage control device 100 can be constituted as a disk array system that comprises a multiplicity of disk drives 121, for example. In addition to comprising inherent unique storage resources (disk drives 121), the storage control device 100 is also able to utilize storage resources (disk drives 221) that an external storage control device 200 comprises. As will be described subsequently, the storage control device 100 provides the host 10 with storage resources that the external storage control device 200 comprises as its own logical volumes (logical units).

The storage control device 100 is broadly categorized as the controller 110 and the storage section 120. The controller 110 is constituted comprising, for example, a plurality of channel adapters ('CHA' hereinbelow) 111, a plurality of disk adapters ('DKA' hereinbelow) 112, a cache memory 113, a shared memory 114, a connection control section 115, and a service processor ('SVP' hereinbelow) 116.

The respective CHA111 perform data communications with the host 10. Each CHA111 comprises at least one communication port 111P for communicating with the host 10. Each CHA111 is constituted as a microcomputer system that comprises a CPU or memory or the like respectively and analyzes and executes a variety of commands that are received from the host 10. A network address for identifying each of the CHA111 (IP address or WWN, for example) is allocated to each CHA111. Each CHA111 can also behave individually as NAS (Network Attached Storage). When a plurality of hosts 10 exist, each CHA111 individually receives and processes a request from each host 10.

Each DKA112 exchanges data between the disk drives 121 that the storage system 120 comprises. Each DKA112 is constituted as a microcomputer system that comprises a CPU or memory or the like as per the CHA111. Each DKA112 is connected via a communication network CN3 such as a SAN to the respective disk drives 121.

Each DKA112 writes the data that the CHA111 receives from the host 10 and data read from the external storage control device 200, for example, to a predetermined address of a predetermined disk drive 121. Further, each DKA112 reads data from the predetermined address of the predetermined disk drive 121 and transmits the data to the host 10 or external storage control device 200.

When data are input and output to and from the disk drive 121, each DKA112 converts the logical address to the physical address. The logical address is an address that indicates the block position of a logical volume 123 and is known as an LBA (Logical Block Address). Each DKA112 performs data access in accordance with a RAID configuration when the disk drive 121 is being managed in accordance with RAID. For example, each DKA 112 writes the same data to separate disk drive groups (RAID groups 122) or executes parity computation and writes data and parities to the disk drive groups.

The cache memory 113 stores data received from the host 10 or external storage control device 200 or stores data read from the disk drive 121. A variety of management information and control information and so forth for use in the operation of the storage control device 100 are stored in the shared memory (sometimes called the 'control memory') 114.

Further, any one or a plurality of the disk drives 121 may be used as a cache disk. Further, the cache memory 113 and shared memory 114 can also be constituted as separate memories, part of the storage region of the same memory can also be used as the cache region and the other storage regions can also be used as control regions.

The connection control section 115 mutually connects the respective CHA111, the respective DKA112, the cache memory 113, and the shared memory 114. The connection control section 115 can be constituted as a crossbar switch that performs data transmissions by means of a high-speed switching operation, for example.

The SVP116 is connected to the respective CHA111 via the communication network CN4 such as a LAN, for example. The SVP116 is able to access information of the respective DKA112, cache memory 113, and shared memory 114 via the CHA111. The SVP116 collects information relating to the various states in the storage control device 100 and supplies this information to the management terminal 20. The user is able to learn the various states of the storage control device 100 via the screen of the management terminal 20. Further, the user is able to set the access path between the host 10 and the logical volume 123, for example, via the SVP116 from the management terminal 20 and set the priority level hold time, and so forth. The SVP116 reflects the information input by the user as the management information and so forth.

The storage section 120 comprises a plurality of disk drives 121. As the disk drives 121, various storage devices such as hard disk drives, flexible disk drives, magnetic tape drives, semiconductor memory drives, and optical disk drives and the equivalents thereof can be employed, for example. Further, disks of different types such as FC (Fibre Channel) disks, SATA (Serial AT Attachment) disks and ATA disks, for example, can also be mixed in the storage section 120.

One RAID group (also called a 'parity group', for example) 122 is formed by a plurality of disk drives 121. One or a plurality of logical volumes 123 of a predetermined size or an optional size can be provided in the physical storage region of the RAID group 122. Further, one or a plurality of logical volumes 123 can also be provided in the storage region of a single disk drive 121. For the sake of the convenience of the invention, this embodiment will be described by taking the example of a case where the respective logical volumes 123 are the same size.

Further, the storage control device 100 comprises a virtual internal volume based on the disk drives 221 of the external storage control device 200. The virtual internal volume is provided to the host 10 in the same way as the internal volumes 123 that are generated on the basis of the disk drives 121 in the storage control device 100.

Figure 3:
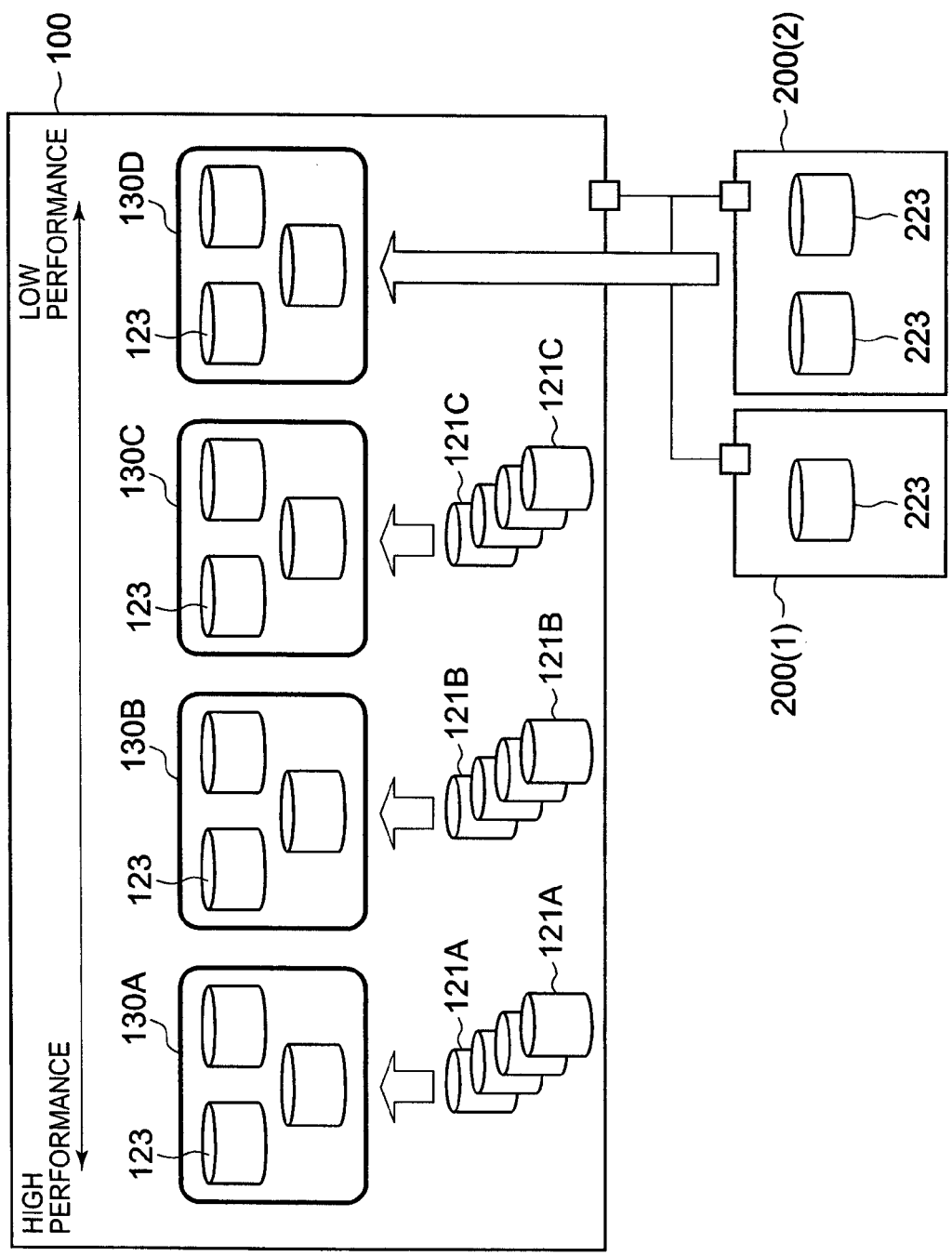
FIG. 3 is an explanatory diagram of an aspect in which volumes are managed in groups in accordance with the performance of the disk drive.

The external storage control device 200 is a separate storage control device that exists outside the storage control device 100 and is therefore called an external storage control device in this embodiment. If the storage control device 100 is called a first storage control device, the external storage control device 200 is called a second storage control device. The storage control device 100 and external storage control device 200 are connected via a communication network CN5 such as a SAN. Hence, if the storage control device 100 is known as the connection source storage control device, the external storage control device 200 is known as the connection destination storage control device. Although only one external storage control device 200 is shown in FIG. 2, a plurality of external storage control devices 200 can be connected to the storage control device 100 as shown in FIG. 3 and so forth.

The communication network CN5 that connects the storage control devices 100 and 200 can be constituted as a communication network that is separate from the communication network CN1 that is used for data I/O that connects the host 10 and storage control device 100. As a result, there is limited influence on communications between the host 10 and the storage control device 100 and data and commands and so forth can be sent and received between the storage control devices 100 and 200. The constitution may instead be such that the communication network CN1 and communication network CN3 are constituted as a shared communication network.

The external storage control device 200 comprises, for example, a controller 210 and a plurality of disk drives 221. The controller 210 is connected to the storage control device 100 via a communication port and a communication network CN5. As mentioned earlier for the storage control device 100, a RAID group 222 is constituted by a plurality of disk drives 221 and logical volumes 223 are provided in the RAID group 222.

The external storage control device 200 can also have substantially the same constitution as that of the storage control device 100 and can also have a simpler constitution than the storage control device 100. The disk drive 221 of the external storage control device 200 is used as an internal storage device of the storage control device 100.

FIG. 3 is an explanatory diagram that schematically shows the constitution of the logical volumes 123 managed by the storage control device 100. The plurality of disk drives 121 of the storage section 120 are categorized into disk drives 121A, 121B, and 121C of a plurality of types and of different performance and reliability. For example, the first type of disk drive 121A is a high-performance and high-reliability disk drive such as an FC disk. The second type of disk drive 121B is a relative high-performance and high-reliability disk drive such as an SAS (Serial Attached SCSI) disk, for example. The third type of disk drive 121C is a relatively low-performance and low-reliability disk drive such as a SATA disk, for example. Further, the above drive types are illustrations and the present invention is not limited to disk drives of the above types.

As a result of collecting disk drives of the same performance and reliability, the volume groups 130A, 130B, and 130C are formed. When no particular distinction is made, the volume groups are called volume groups 130. The volume group 130A of the highest rank is a group of high-performance logical volumes 123 generated on the basis of the high-performance disk drive 121A. The volume group 130B which is one volume group below the highest rank volume group 130A is a group of medium-reliability logical volumes 123 generated on the basis of the medium-performance disk drive 121B. The volume group 130C which is one further rank below the highest rank volume group 130A is a group of low-reliability logical volumes 123 generated on the basis of the low-performance disk drive 121C.

The lowest rank volume group 130D is a group of logical volumes 123 that correspond with the logical volumes 223 in the external storage control device 200. When the logical volume 123 in the storage control device 100 is called an internal volume, the logical volumes 223 in the external storage control device 200 can be called an external volume. In this embodiment, the lowest rank volume group 130D is constituted as a set of external volumes 223.

As described subsequently, in this embodiment, the value of the respective data is measured and managed by means of a particular index such as the priority level. Further, the storage location of the respective data is determined in accordance with the priority level. The higher the priority level of the data, the higher the volume group 130 the data are moved to. The lower the priority level of the data, the lower the volume group 130 that the data are moved to. At least one or more provided temporary volumes are employed in the respective volume groups 130 in the migration of data between volume groups.

Further, 'high performance' and 'low performance' refer to relative expressions that are employed for an understanding of the present invention and, even when a low-performance disk drive 121C is used, the reliability of the storage control device 100 remains intact.

Figure 4:
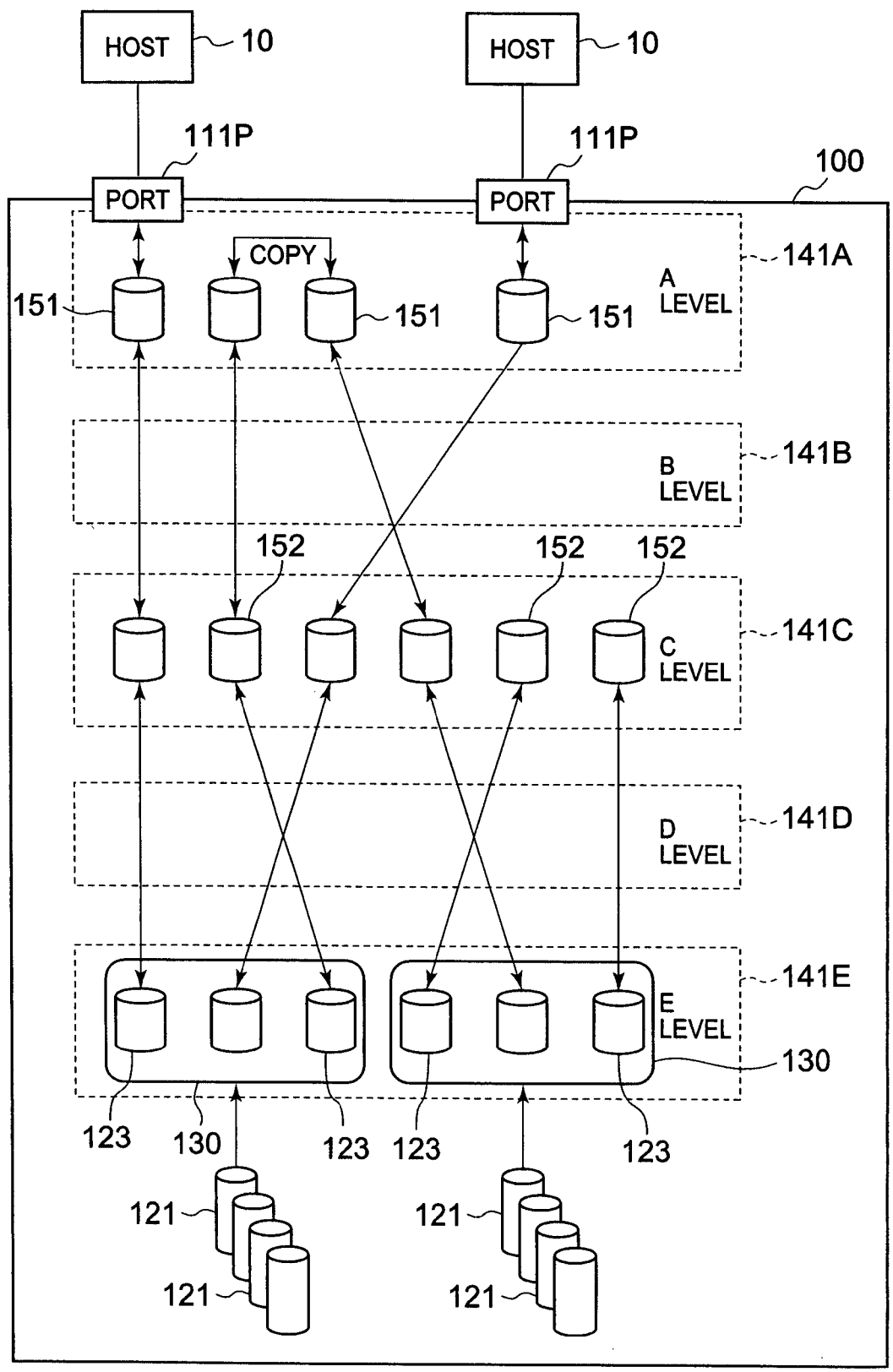
FIG. 4 is an explanatory diagram of the management levels in the storage control device.

FIG. 4 is an explanatory diagram that schematically shows the constitution of a plurality of levels that are formed in the storage control device 100. The storage control device 100 is provided, in order starting from the side closest to the host 10, with an A level 141A, B level 141B, C level 141C, D level 141D, and E level 141E.

A level 141A which is closest to the host 10 is an access path management level that manages the access path from the host 10 to the logical volumes 123. A level 141A manages the ports 111P and access points 151 and so forth. Further, an enclosure-internal volume copy such as one whereby a volume is copied from one volume to another volume within the storage control device 100 is also executed by forming a copy pair by means of a plurality of access points 151 that are accessed by the host 10, which is managed by A level 141A.

B level 141B is provided in a position below A level 141A. B level 141B is a mapping level for managing the relationships of correspondence between A level 141A and C level 141C. B level 141B manages the relationship between the access points 151 and management volumes 152. Which access point 151 is accessed by which logical volume 123 can be managed by B level 141B. That is, the actual access destination volume 123 can be switched without changing the access point 151 accessed by the host 10. Further, access attributes can also be set in B level 141B.

C level 141C is provided below B level 141B. C level 141C forms an 'intermediate management level' together with B level 141B and a subsequently described D level 141D. C level 141C manages the values of data stored in the logical volume 123 as priority levels. The priority levels are managed separately from the logical volume 123 in which data are stored.

D level 141D is provided below C level 141C. D level 141D is a second mapping level for managing the relationship between C level 141C and E level 141E. D level 141D controls which logical volume 123 is managed by which management volume 152.

E level 141E is a volume management level for classifying and managing the respective logical volumes 123 in volume groups 130 according to performance and reliability.

Figure 5:
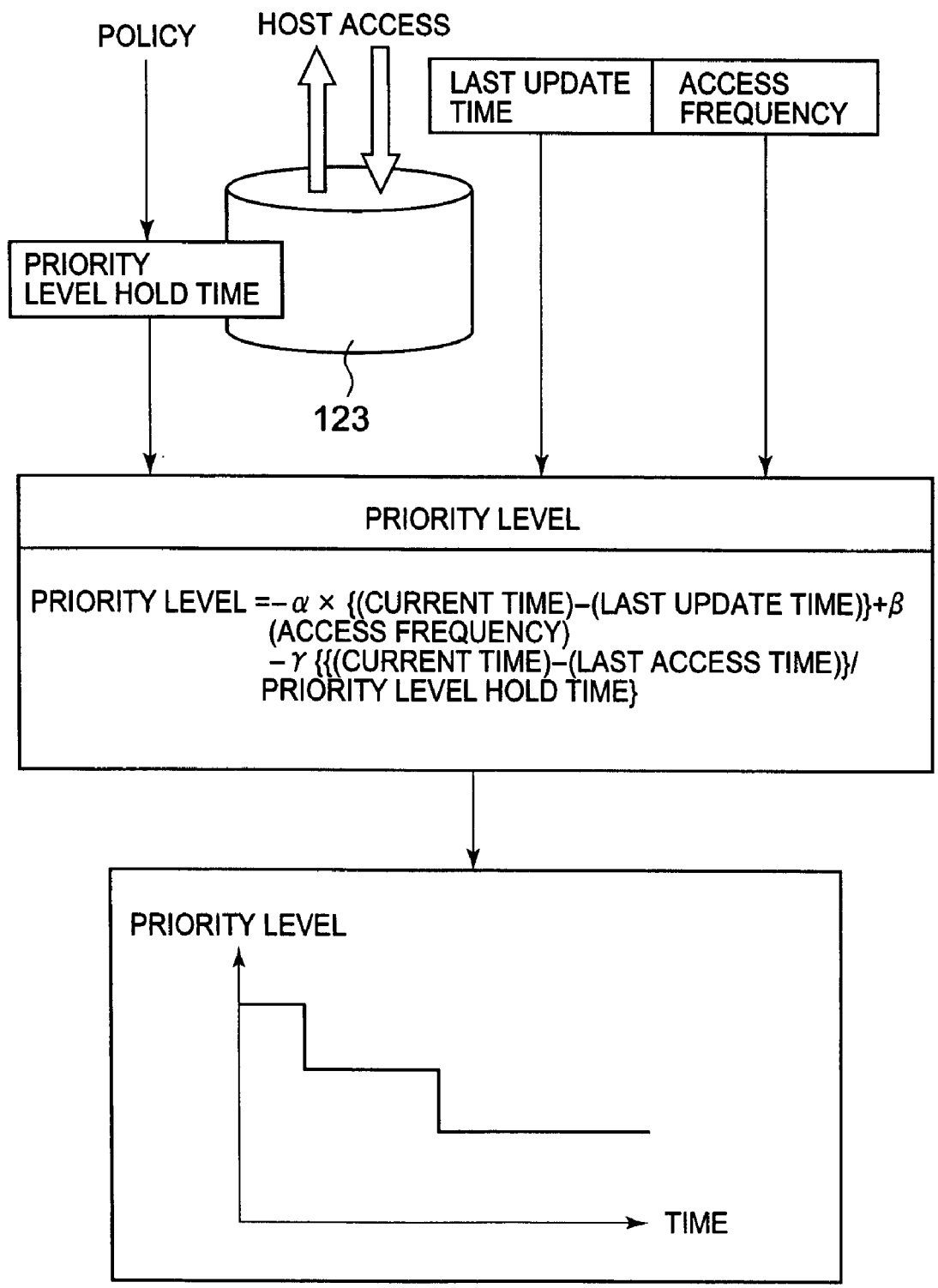
FIG. 5 is an explanatory diagram of a priority level calculation method.

FIG. 5 is an explanatory diagram of a priority calculation method. As parameters for calculating the priority level, the access frequency, last update time (and last access time), and priority level hold time, for example, are used. The user is able to set arbitrary times as priority level hold times in accordance with the data migration policy. The last update time, last access time, and access frequency are obtained by analyzing the access request issued by the host 10.

The priority level is calculated using the following equation, for example.

$$\text{Priority level} = -\alpha \times \{(\text{current time}) - (\text{last update time})\} + \beta(\text{access frequency}) - \gamma\{\{(\text{current time}) - (\text{last access time})\}/\text{priority level hold time}\} \quad (\text{Equation 1})$$

Although initial values are each prepared for the respective coefficients $\alpha$, $\beta$, and $\gamma$ in Equation 1, the user is also able to suitably adjust the values of the coefficients. The computation result of $\gamma\{\{(\text{current time}) - (\text{last access time})\}/\text{priority level hold time}\}$ discards figures below the decimal point.

According to Equation 1, the closer the last update time, the higher the priority level. According to Equation 1, the higher the access frequency, the higher the priority level. According to Equation 1, each time the priority level hold time elapses after the time the data were last accessed, the priority level drops stepwise. Therefore, as shown at the bottom of FIG. 5, the priority level of the data drops stepwise as time elapses. However, the graph shown in FIG. 5 schematically shows an example in which the priority level changes in order to permit an understanding of the invention. This does not mean that the priority level of all the data changes as shown in FIG. 5.

Figure 6:
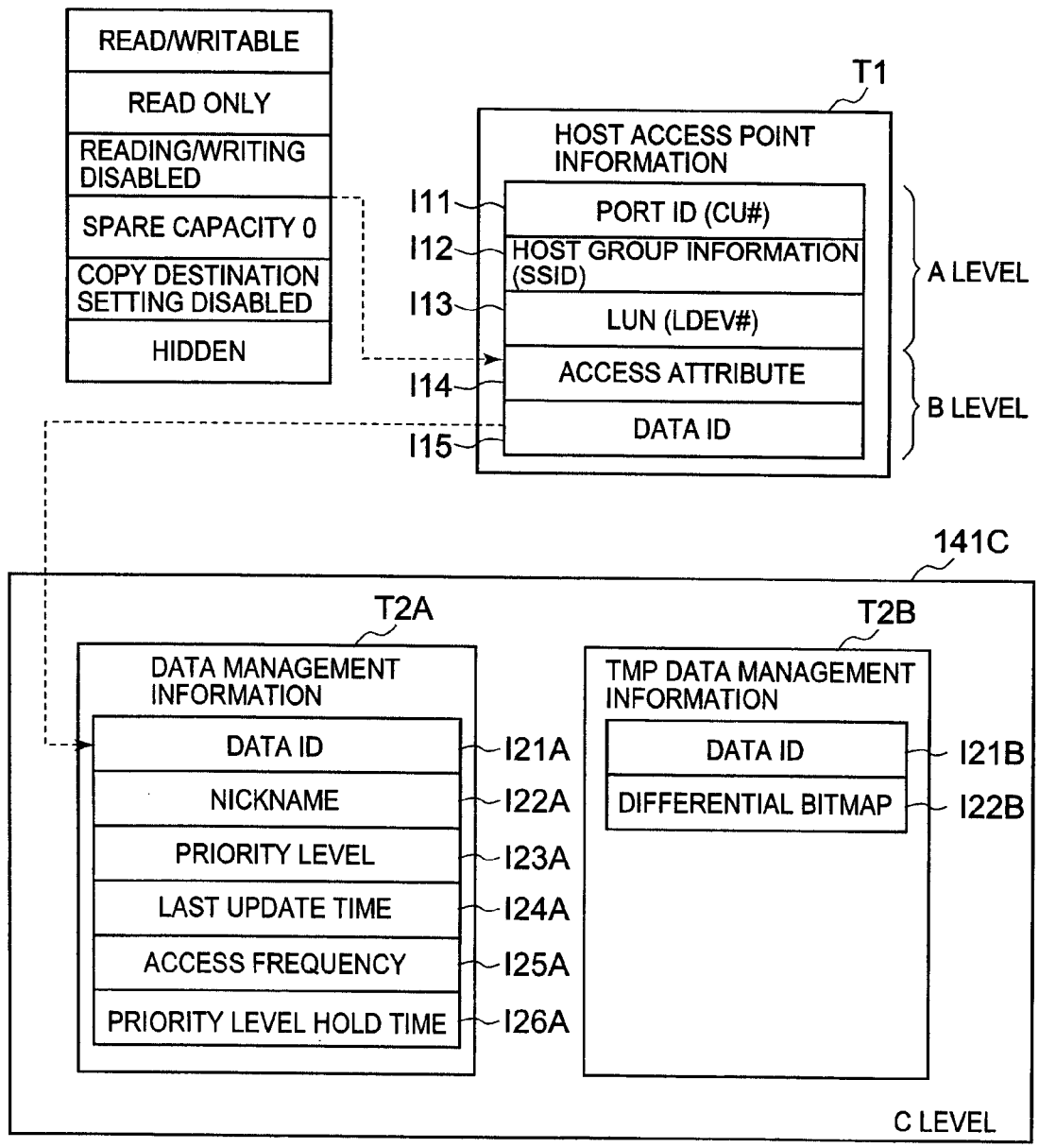
FIG. 6 is an explanatory diagram of the constitution of information that is managed on levels A, B, and C.

FIG. 6 is an explanatory diagram of information managed by A level 141A, B level 141B, and C level 141C. The host access point information T1 is managed by A level 141A and B level 141B.

The host access point information T1 is information that defines the access path and so forth whereby the host 10 accesses the data. The host access point information T1 comprises, for example, the management items of port ID_I11, host group information I12, LUN_I13, access attribute I14, and data ID_I15. Further, the case above is one where the so-called host 10 is an open-system host. In the case of a main frame-system host, the port ID is changed to the CU (Command Unit) number, the host group information is changed to the SSID (Subsystem ID), and the LUN is changed to the LDEV number.

The access attribute I14 can be set to the values of readable and writeable, read-only, read and write-prohibited, spare capacity 0, copy destination setting prohibited, and a hidden value, for example. The spare capacity 0 is an attribute that sends back a response to the effect that there is absolutely no spare capacity irrespective of the value for the actual spare capacity in response to a capacity inquiry command from the host 10. A hidden value is an attribute in which a response to the inquiry command from the host 10 is not sent back and is hidden.

Data ID is identification information for uniquely specifying the respective data managed by the storage control device 100. The port ID (CU number), host group information (LDEV number), and LUN (SSID) are managed by A level 141A. The access attribute and data ID are managed by B level 141B.

Data management information T2A and TMP data management T2B which are managed by C level 141C are shown at the bottom of FIG. 6. Data management information T2A is information for managing data stored in the respective logical volumes 123. The TMP data management information T2B is information for managing data stored in temporary volumes at least one of which is provided in each of the volume groups 130.

Data management information T2A includes the management items of data ID_121A, nickname I22A, priority level I23A, last update time I24A, access frequency I25A, and priority level hold time I26A, for example. Further, here, the last access time is also managed within the last update time I24A. The nickname is information for specifying data simply.

The TMP data management information T2B manages data ID_121B and differential bitmap I22B, for example. The differential bitmap I22B is difference management information for managing differences between data copied first to the temporary volume and copy source (migration source) data.

Figure 7:
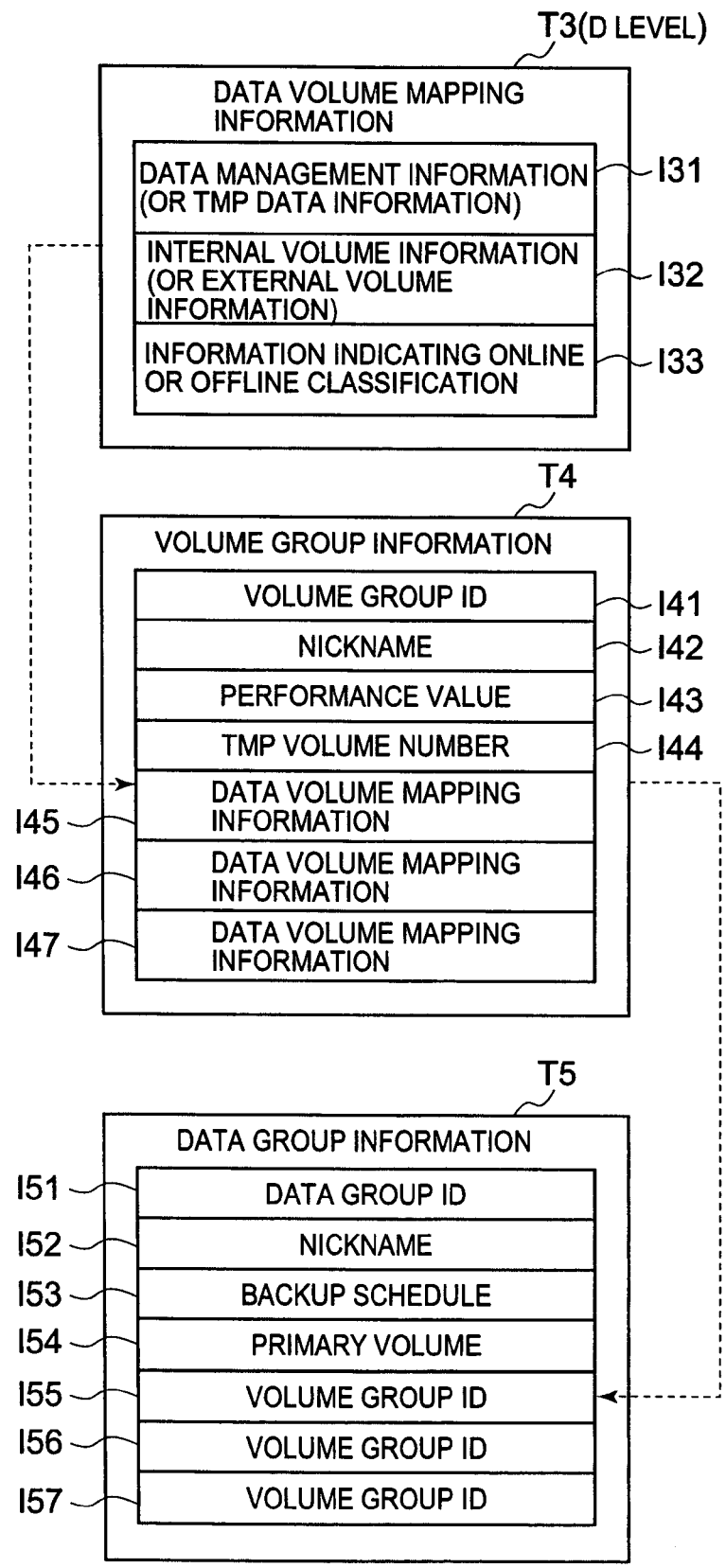
FIG. 7 is an explanatory diagram of the constitution of information that is managed on level D.

FIG. 7 shows information and so forth managed by D level 141D. The data volume mapping information T3 is managed by D level 141D. The data volume mapping information T3 is information indicating the relationship of correspondence between data and the logical volumes 123. The information T3 comprises, for example, data management information I31, internal volume information I32, and information I33 distinguishing whether the logical volumes are online or offline.

Figure 8:
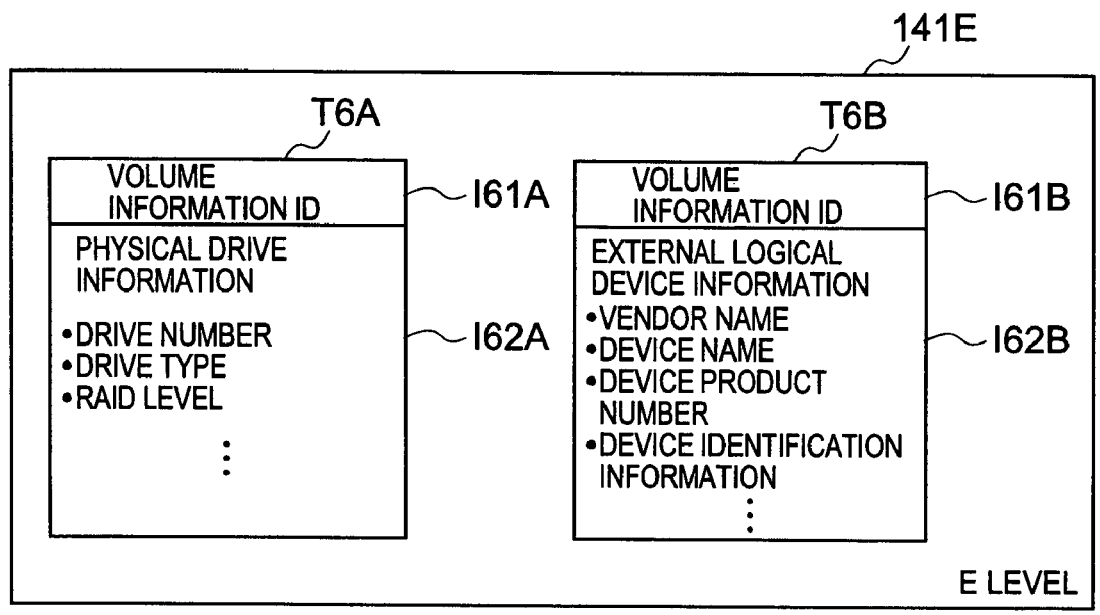
FIG. 8 is an explanatory diagram of the constitution of information that is managed on level E.

Either data management information T2A or TMP data management information T2B shown in FIG. 6 is set as the data management information I31. Either internal volume information T6A or external volume information T6B described subsequently in FIG. 8 is set as the internal volume information I32. Information indicating whether the logical volumes 123 are in an online state or offline state is set as item I33.

Volume group information T4 is information for managing the respective volume groups 130. The volume group T4 comprises, for example, volume group ID_I41, nickname I42, performance value I43, TMP volume number I44, and a plurality of data volume mapping information items I45 to I47.

The volume group ID_I41 is information for uniquely specifying a volume group 130. The nickname I42 is information for simply specifying the volume group 130. The performance value I43 is information indicating a value related to the performance of the volume group 130. Performance-related information can include the type of disk drive 121 and the access speed or the like, for example. The TMP volume number I44 is information indicating the number of temporary volumes provided in the volume group 130. The data volume mapping information items I45 to I47 are information for specifying the data volume mapping information T3 shown at the top of FIG. 7.

The data group information T5 is management information that is to be used in the backup processing. The data group information T5 manages, for example, a data group ID_I51, nickname I52, a backup schedule I53, a primary volume I54, and at least one or more volume groups ID_I55 to I57.

The data group ID_I51 is information for specifying a data group that forms a copy pair from a primary volume and secondary volume. The nickname is information for simply specifying the data group. The backup schedule I53 is information indicating the schedule for backing up the data of the primary volume. The primary volume I54 is information for specifying a primary volume. The volume groups ID_I55 to I57 are information for specifying volume group information T4. By using the data group information T5, it is possible to manage which data of which primary volume are backed up to which logical volume 123 of which volume group 130 with which timing.

FIG. 8 is an explanatory diagram of an internal volume information T6A and external volume information T6B managed by E level 141E. The internal volume information T6A is information for managing a logical volume 123 that exists in the storage control device 100. The external volume information T6B is information for managing a logical volume 223 that exists in the external storage control device 200.

The internal volume information T6A comprises, for example, a volume ID_I61A and physical drive information I62A. The physical drive information I62A stores information relating to the RAID group 122 and disk drive 121 and so forth in which the logical volume 123 specified by a volume ID_I61A is provided. For example, information (the drive number) for specifying the disk drive 121 in which the logical volume 123 is provided can include the type of the disk drive 121, the RAID level of the RAID group 122, and the capacity and so forth.

The external volume information T6B comprises a volume ID_I61B and an external logical device information I62B, for example. The external logical device information I62B stores information for specifying the logical volumes 223 in the external storage control device 200. For example, this information includes the name of vendor that supplies the external storage control device 200, the product name of the external storage control device 200, the product number of the external storage control device 200, and identification information for accessing the logical volumes 223 (the port numbers, LUNs, and volume numbers, for example).

The method for causing data to migrate between the respective volume groups 130 on the basis of the priority level will now be described on the basis of the FIGS. 9 to 11. The details of the method for determining the priority level, the method for data migration, and the method for copying the data first before the data migration will be described subsequently together with the individual figures.

FIG. 9 is an explanatory diagram of an aspect in which data of a high priority level are made to migrate to a upper volume group 130 before data migration is started. Processing in which data of a high priority level are copied to the temporary volume in the upper volume group before data migration is executed is known as preliminary disposition processing. In the following description, the volume group 130A will be described as the upper volume group and the volume group 130B will be described as the lower volume group by way of example.

Figure 9A:
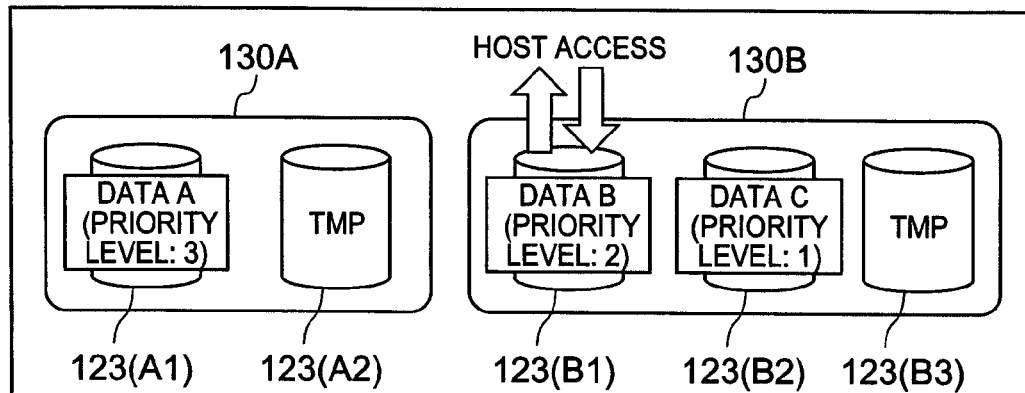
FIG. 9 is an explanatory diagram of preliminary disposition processing in which data of a lower volume are copied to a higher temporary volume beforehand.

FIG. 9A shows a state prior to starting the preliminary disposition processing. Data A of priority level "3" are stored in the logical volume 123 (A1) of the upper volume group 130A. The volume 123 (A2) is set as the temporary volume. Data B of priority level "2" are stored in the logical volume 123 (B1) of the lower volume group 130B and data C of priority level "1" are stored in the logical volume 123 (B2). The volume 123 (B3) is set as the temporary volume.

When the lower volume group 130B is considered, data B is accessed by the host 10 frequently and the priority level is set as "2". Therefore, the priority level of data B has a larger priority level than the priority level "1" of other the data stored in the lower volume 130B and the highest priority level in the data stored in the lower volume group 130B. Therefore, data B has a high probability of migrating to the upper volume group 130A during the next data migration processing.

Figure 9B:
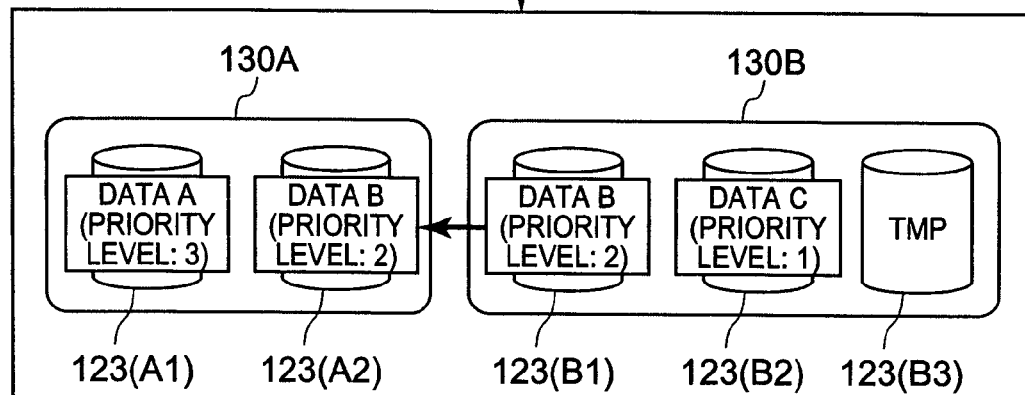

As shown in FIG. 9B, the controller 110 copies data B that has the highest priority level in the lower volume group 130B to the temporary volume 123 (A2) in the upper volume group 130A when a time comes when the host 10 is not accessing data B. That is, in the preliminary disposition processing, a copy pair is established in which the logical volume 123 (B1) that stores the data B of the highest priority level in the lower volume group 130B is the copy source and the temporary volume 123 (A2) in the upper volume group 130A is the copy destination.

Figure 9C:
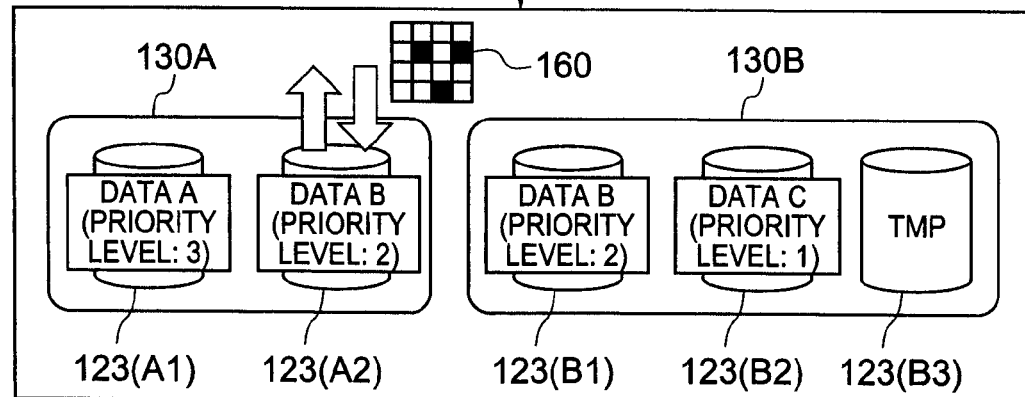

As shown in FIG. 9C, the data copying from the lower logical volume 123 (B1) to the upper temporary volume 123 (A2) is performed while differences are managed. The differential bitmap 160, for example, is used for the difference management.

When an access request to data B is issued by the host 10, the controller 110 basically processes an access request by using data B stored in the upper temporary volume 123 (A2).

That is, the write data received by the host 10 are written in the temporary volume 123 (A2). The difference produced by the update of write data is recorded in the differential bitmap 160. The data for which reading has been requested by the host 10 are read from the temporary volume 123 (A2). When the reading of the data that exist only in the copy source logical volume 123 (B1) has been requested, the controller 110 reads the data from the logical volume 123 (B1) and transmits the data to the host 10.

Further, the data of the highest priority level in the lower volume group are also copied beforehand to the temporary volume 123 (B3) in the lower volume group 130B.

Thus, the data B of the highest priority level in the lower volume group 130B are copied to the temporary volume 123 (A2) in the upper volume group 130A beforehand and the access request from the host 10 is processed using the temporary volume 123 (A2). The upper temporary volume 123 (A2) is formed on the basis of the higher performance disk drive 121 and, therefore, the access request can be processed rapidly and the responsiveness of the storage control device 100 can be improved.

FIG. 10 is an explanatory diagram of processing in a case where the preliminary disposition of data B fails. The priority level of the respective data A to C are calculated and updated at regular and irregular intervals. FIG. 10A shows an aspect at a time where the preliminary disposition of data B is complete. At this point in time, the latest stored content of data B is held in the upper temporary volume 123 (A2) and the stored content when the preliminary disposition is started is stored in the lower logical volume 123 (B1). The difference between the volume 123 (A2) and the volume 123 (B1) is managed by the differential bitmap 160.

Therefore, after completing the preliminary disposition, data B are stored in both the volume 123 (A2) and volume 123 (B1) of different types. Therefore, when a fault is produced in either volume 123 (A2) or volume 123 (B1), the latest data B can be obtained using the other volume.

Figure 10A:
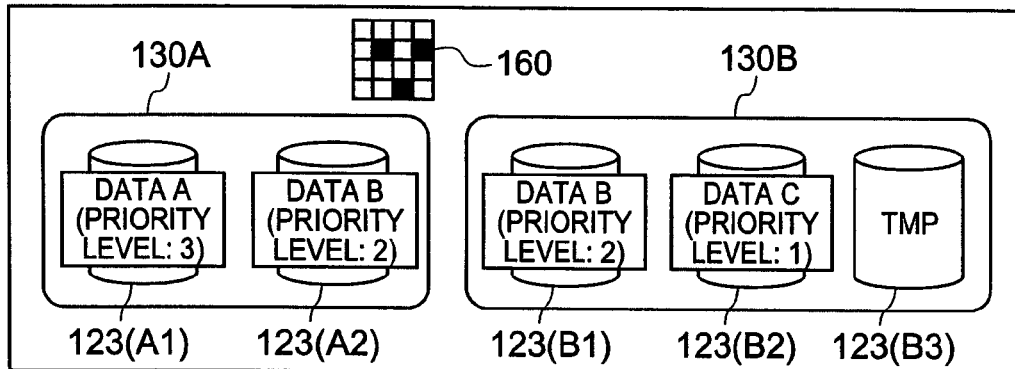
FIG. 10 is an explanatory diagram of processing in a case where preliminary disposition has failed.
Figure 10B:
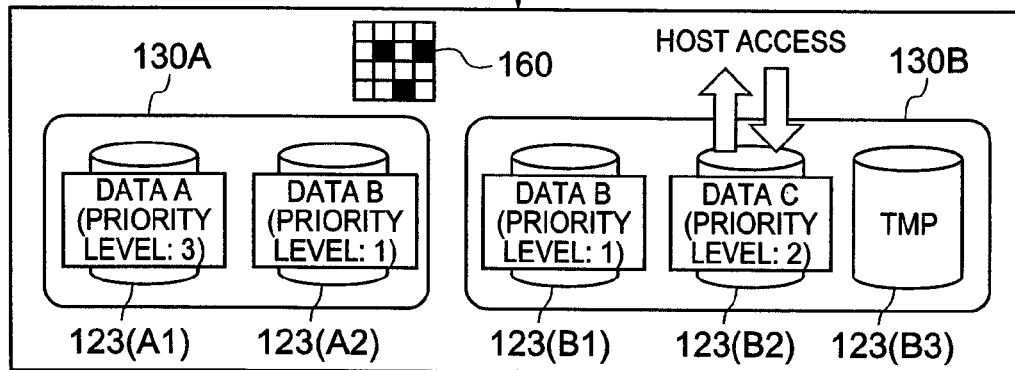

The priority level of data changes gradually with time in accordance with the state of being accessed by the host 10. Hence, as shown in FIG. 10B, a situation where the priority level of data B that are copied to the upper temporary volume 123 (A2) subsequently drops from "2" to "1" may also be considered. In FIG. 10B, while the priority level of data B drops by one, the priority level of data C increases from "1" to "2".

Figure 10C:
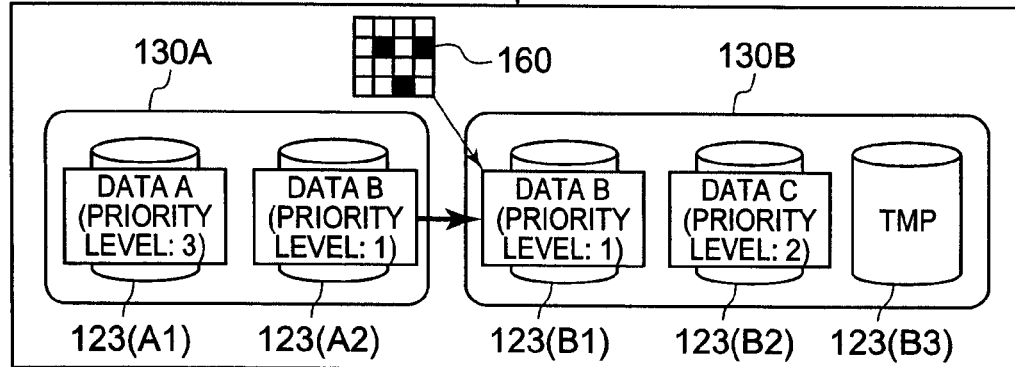

Therefore, as shown in FIG. 10C, the controller 110 uses data B in the differential bitmap 160 and upper temporary volume 123 (A2) to place data B in the lower logical volume 123 (B1) in the latest state. Thus, after data B have been written back from temporary volume 123 (A2) to logical volume 123 (B1), the controller 110 copies data C with the highest priority level from the logical volume 123 (B2) to the temporary volume 123 (A2).

Figure 10D:
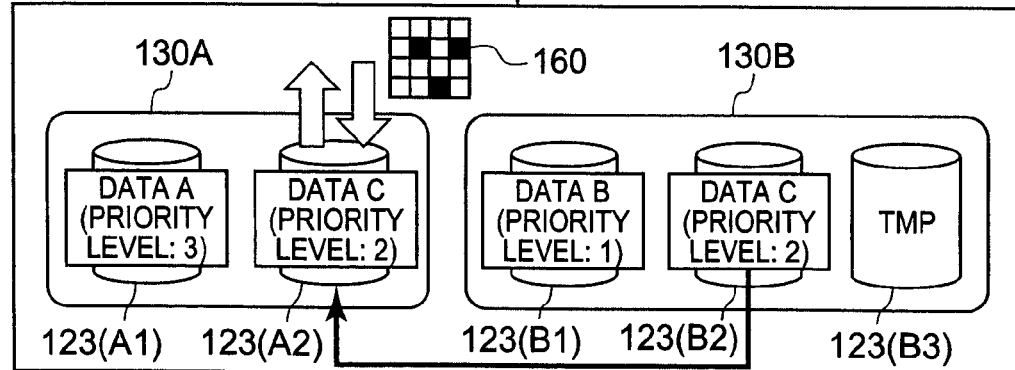

Ultimately, the controller 110 uses data C stored in temporary volume 123 (A2) to process access requests from the host 10 as described in the preliminary disposition processing of data B (FIG. 10D).

Figure 11A:
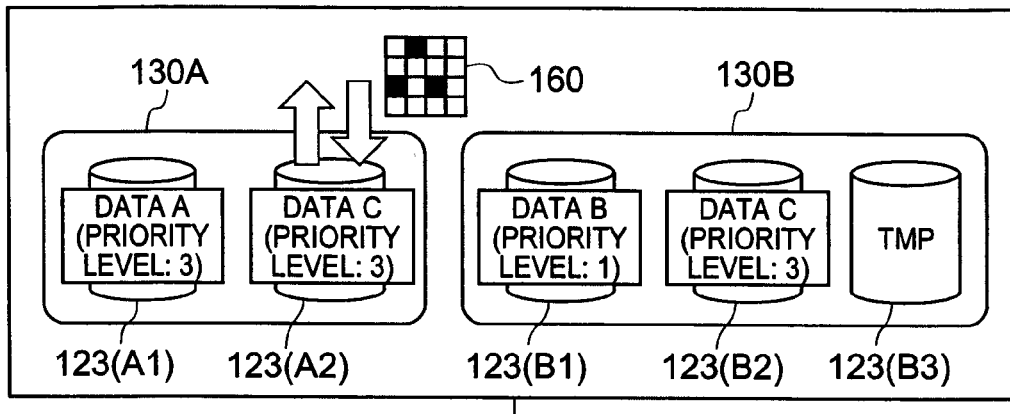
FIG. 11 is an explanatory diagram of processing to move data of a higher volume to a lower volume.

FIG. 11 is an explanatory diagram of data migration processing that re-disposes the respective data in the logical volumes 123 which each have a suitable performance, in accordance with the priority level of the respective data. FIG. 11A shows the state prior to the start of data migration processing. The data Dc with the highest priority level in the lower volume group 130B are pre-stored in the temporary volume 123 (A2) in the upper volume group 130A by the preliminary disposition processing mentioned earlier. The differences between the volume 123 (A2) and volume 123 (B2) are managed by the differential bitmap 160. Access requests from the host 10 are processed by using data Dc in the upper temporary volume 123 (A2).

However, at the point shown in FIG. 11A, the formal storage destination (storage destination device) for data Dc is copy source volume 123 (B2). The upper temporary volume 123 (A2) is only used as a temporary storage destination for data Dc.

Figure 11B:
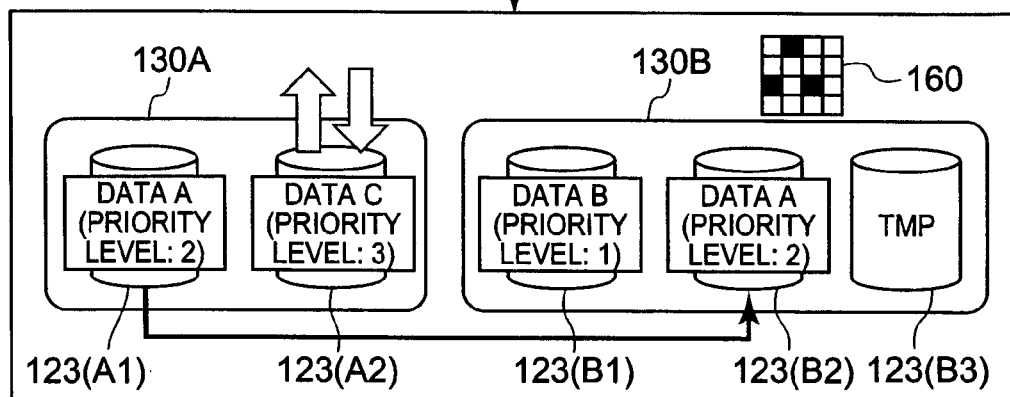

FIG. 11B shows the result of data migration processing being executed. Here, the priority levels of the respective data Da, Db, and Dc are first calculated and, as a result, the priority level of data Da is lowered from "3" to "2".

The priority level of data Dc has a high priority level and is unchanged at "3". Therefore, the movement of data Dc from lower volume group 130B to upper volume group 130A is determined. As a result of the above preliminary disposition processing, data Dc are copied beforehand to the temporary volume 123 (A2) in the upper volume group 130A and the controller 110 processes an access request from the host 10 by using data Dc that have been copied to the temporary volume 123 (A2).

Therefore, the data Dc that are copied beforehand to the temporary volume 123 (A2) hold the latest state. Hence, the controller 110 rewrites information managed in C level 141C and D level 141D and establishes the temporary volume 123 (A2) as a storage device for data Dc. That is, the data migration from lower volume group 130B to upper volume group 130A is completed directly simply by rewriting the management information.

As a result of data Dc migrating to the upper volume group 130A, volume 123 (B2) which is the migration source can be used as a second temporary volume. Therefore, the controller 110 copies data Da with the lowest priority level in the upper volume group 130A from the upper logical volume 123 (A1) to the lower temporary volume 123 (B2). In other words, the controller 110 establishes a copy pair of the volume 123 (A1) and volume 123 (B2) and manages differences between the two volumes by means of a differential bitmap 160 until the data migration is complete.

Figure 12:
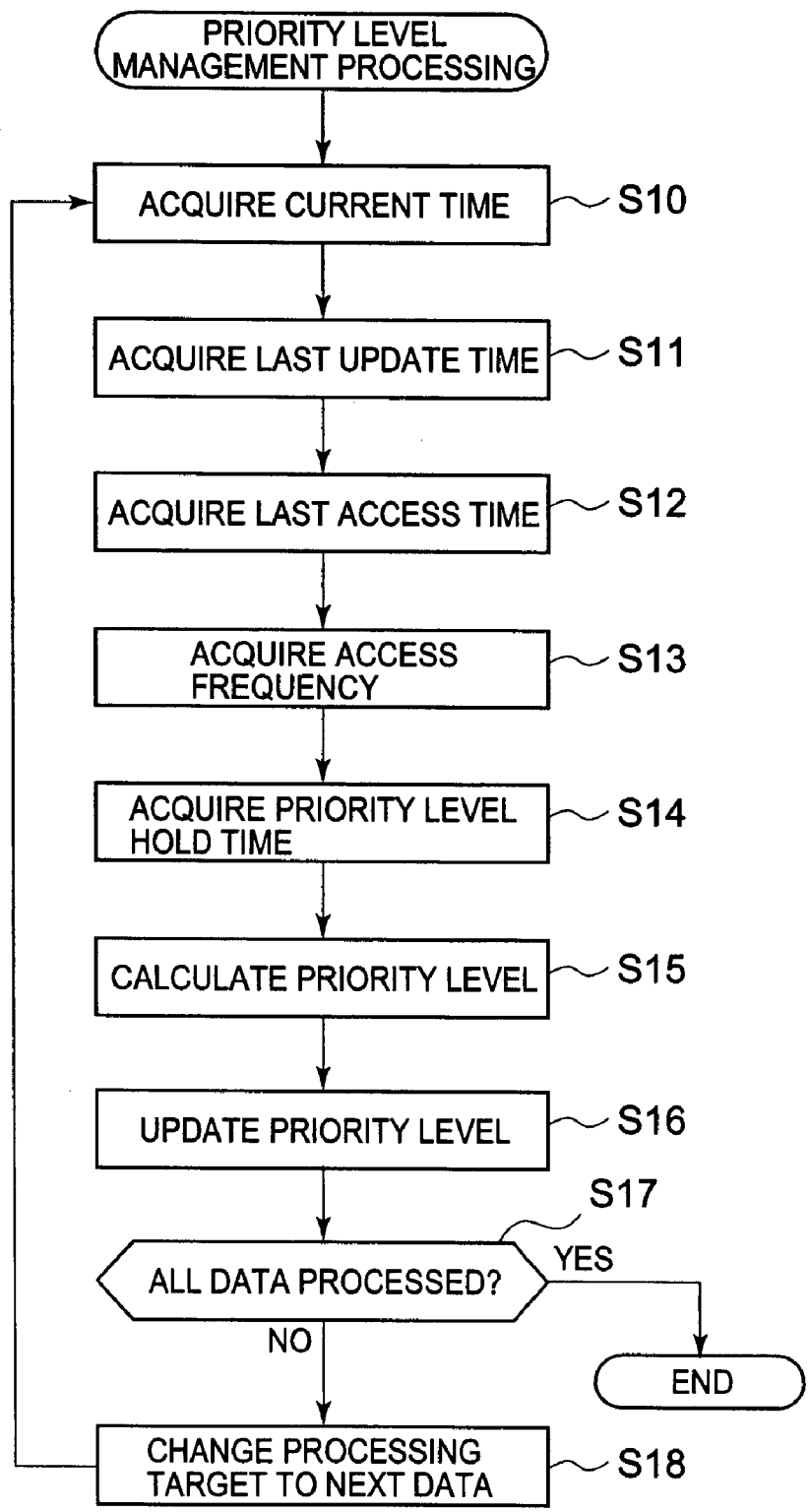
FIG. 12 is a flowchart of priority management processing.

FIG. 12 is a flowchart that shows the priority level management processing. The subsequent respective processes that include this processing are implemented as a result of the controller 110 executing a predetermined program. Further, the respective flowcharts that will be subsequently described provide an overview of the processing to the extent required in order to understand and implement the present invention and sometimes differ from the actual program. The modification, addition, and deletion of steps can be suitably performed by a person skilled in the art.

The controller 110 acquires information related to the current time from the timer and counter and so forth provided in the controller 110, for example (S10). The controller 110 acquires the last update time (S11), the last access time (S12), the access frequency (S13), and the priority level hold time (S14). The controller 110 then calculates the priority level by using Equation 1 above (S15) and rewrites the priority level in the data management information T2A to the latest value (S16).

The controller 110 judges whether the priority level has been calculated for all the data (S17). When unprocessed data remain (S17: NO), the controller 110 changes the processing target to the next data (S18) and returns to S10. When a priority level calculation and update are complete for all data, the processing ends.

Figure 13:
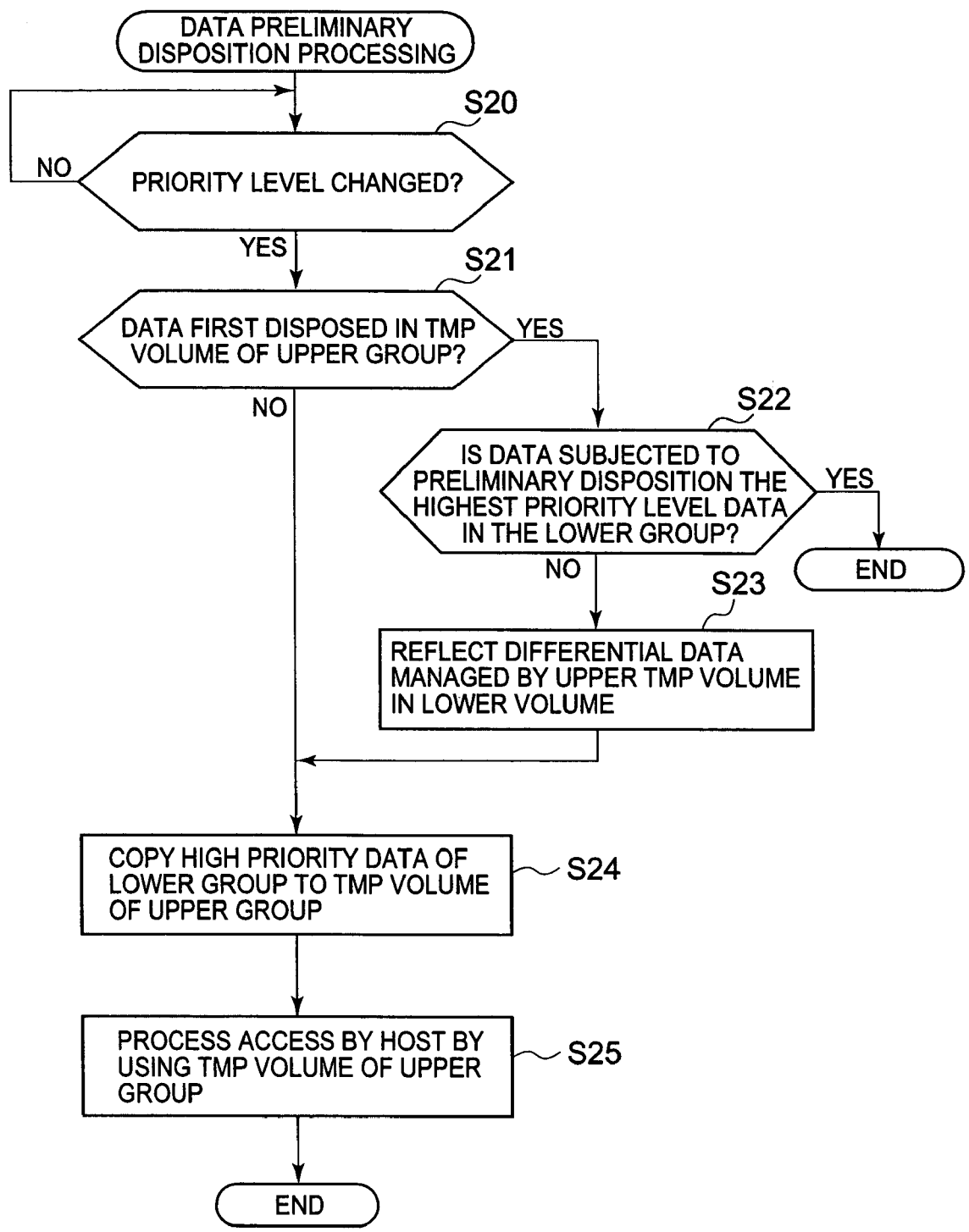
FIG. 13 is a flowchart of data preliminary disposition processing.

FIG. 13 is a flowchart showing the preliminary disposition processing. The controller 110 judges whether the priority level has been changed (S20). When the priority levels have been changed by the priority level management processing (S20: YES), the controller 110 judges whether data of the highest priority in the lower volume group have been copied beforehand to the temporary volume in the upper volume group (S21). That is, the controller 110 judges whether the data of the migration target have been copied beforehand to the migration destination volume group before the data migration processing has started.

When data of the highest priority have been copied beforehand to the upper temporary volume (S21: YES), the controller 110 judges whether the data that have been pre-copied have the highest priority level in the lower volume group (S22). In cases where the data currently with the highest priority level in the lower volume group have already been copied to the temporary volume in the upper volume group, this processing is terminated.

In contrast, when the priority level of the data of the lower volume that was first disposed in the previous preliminary disposition processing is changed and is not the highest priority level in the lower volume group (S22: NO), the previous preliminary disposition fails. Therefore, the controller 110 places the data in the lower volume in the latest state by writing the differential data managed by the upper temporary volume to the copy source lower volume (S23).

When the data of the highest priority level have not been pre-copied to the upper temporary volume in the lower volume group (S21: NO), the controller 110 copies data of the highest priority level in the lower volume group to the temporary volume in the upper volume group (S24). The differences between the lower volume which is the copy source and the upper temporary volume which is the copy destination are managed by the upper volume group. The controller 110 uses the data that have been copied to the upper temporary volume to process an access request from the host 10 (S25).

Figure 14:
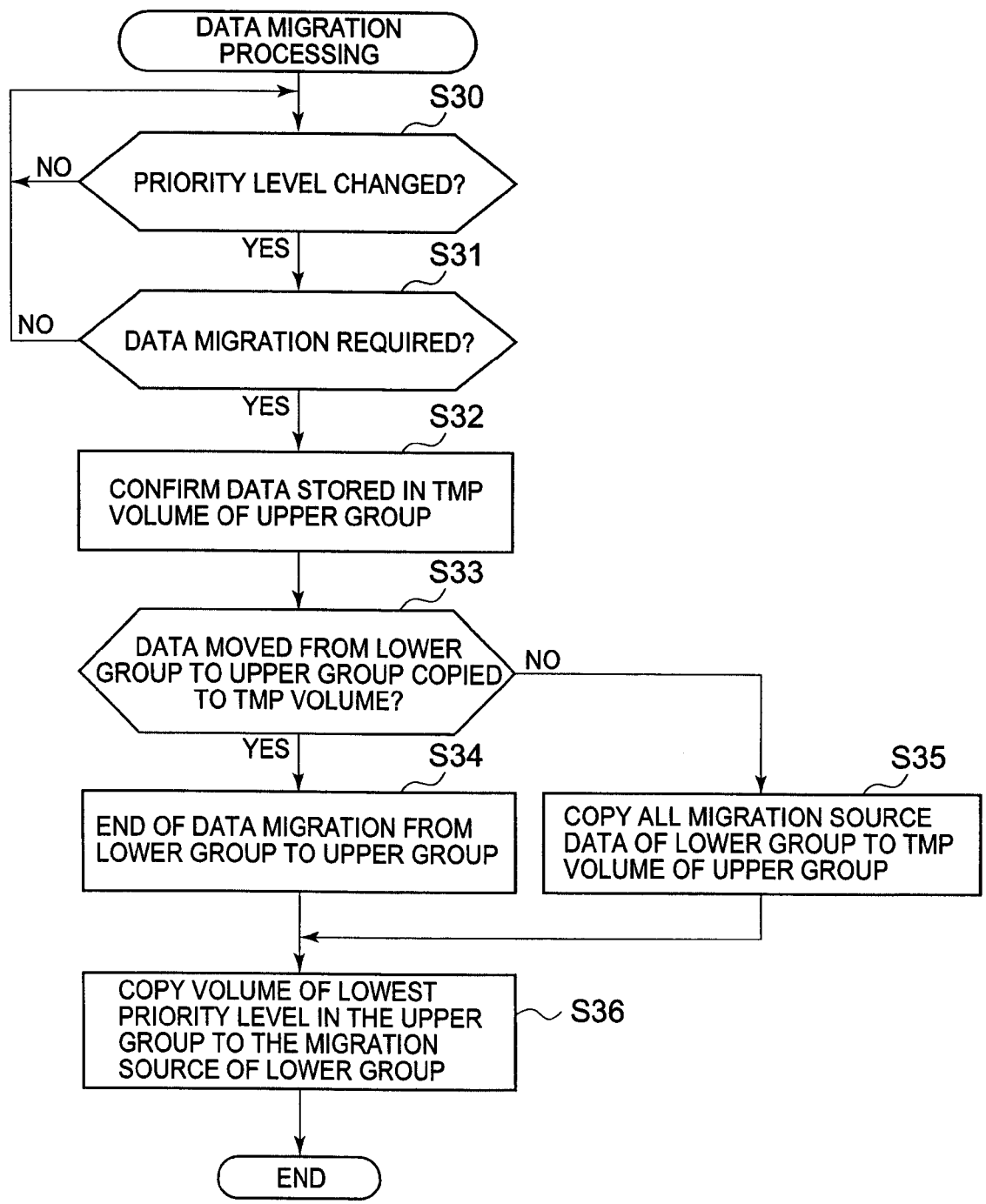
FIG. 14 is a flowchart of data migration processing.

FIG. 14 is a flowchart that shows data migration processing. The controller 110 judges whether the priority level has changed (S30). Thereafter, the controller 110 judges whether data migration is necessary (S31).

When it is judged that the priority levels of at least part of the data have been changed (S30: YES) and data must be moved (S31: YES), the controller 110 starts data migration as described below.

In S31, for example, it is judged whether data migration is to be performed on the basis of the data migration preset by the user. For example, when the user pre-designates the execution time of the data migration, the controller 110 judges whether the designated execution time has arrived.

When the start of data migration is determined, the controller 110 confirms the data stored in the temporary volume in the upper volume group (S32). The controller 110 judges whether data for which migration from the lower volume group to the upper volume group has been determined have already been copied to the upper temporary volume (S33).

As a result of the preliminary disposition processing, data of a high priority level are pre-copied to the upper temporary volume before the data migration processing is started. Hence, the controller 110 judges in S33 whether the preliminary disposition has succeeded.

When the preliminary disposition has succeeded (S33: YES), the controller 110 terminates the data migration from the lower volume group to the upper volume group by rewriting the management information of the data first disposed (S34).

When the preliminary disposition fails as a result of the change in priority levels (S33: NO), the controller 110 copies the data with the highest priority level in the lower volume group to the temporary volume in the upper volume group (S35).

Finally, the controller 110 moves data of the lowest priority level by copying data of the lowest priority level in the upper volume group to the specified volume in the lower volume group (S36). The specified volume is volume 123 (B2) shown in FIG. 11B, for example. That is, the specified volume is a volume in the lower volume group for which new data can be accepted for the data migration from the lower volume group to the upper volume group.

The embodiment affords the following effects on account of having the above constitution. In this embodiment, the constitution is such that data are made to migrate between respective volume groups by using the temporary volume provided in each volume group. Hence, the time required for the data migration can be shortened and user convenience improves.

In this embodiment, the constitution is such that data of the migration target are pre-copied to the temporary volume in the volume group which has been preset as the migration destination before the data migration is performed. Therefore, data migration can be rapidly completed and user convenience improves.

In this embodiment, the constitution is such that the value of the data is judged and the respective data are then disposed in volumes of suitable performance. Hence, disk drives 121 whose performance and reliability differ can also be effectively used and user convenience improves.

In this embodiment, the constitution is such that the priority level is changed each time the priority level hold time designated by the user has elapsed. Hence, the value of the data that cannot be measured simply from the access frequency and last access time and so forth can be assessed.

In this embodiment, the constitution is such that one temporary volume is prepared in each of the volume groups and a logical volume capable of accepting new data in accordance with the completion of data migration is used as another temporary volume. Therefore, the volume of the storage control device 100 can be effectively used and user convenience can be improved while suppressing an increase in costs.

Second Embodiment

The second embodiment of the present invention will now be described on the basis of FIGS. 15 and 16. The subsequent embodiments that include this embodiment correspond to modified examples of the first embodiment above. In this embodiment, the supply of power to the external storage control devices 200 is stopped by setting the external volumes 223 provided by the external storage control devices 200 to an offline state as far as is possible and the power consumption amount of the whole storage system is reduced.

Figure 15A:
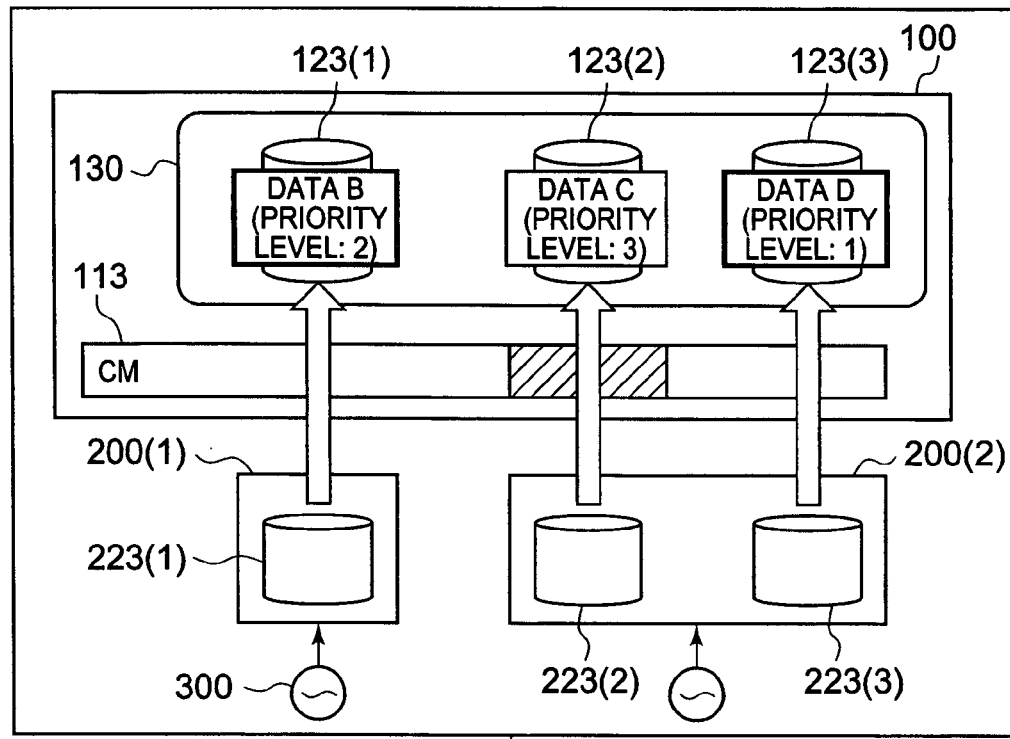
FIG. 15 is an explanatory diagram of an aspect according to a second embodiment in which a volume corresponding with an external storage control device is shifted to an offline state and the supply of power to the external storage control device is stopped.

FIG. 15 is an explanatory diagram that shows an aspect in which volumes in an offline state are grouped in the external storage control devices 200 and the power supply to the external storage control devices 200 is stopped. As shown in FIG. 15A, the volume group 130 is constituted by logical volumes 123(1) to 123(3) corresponding to the external volumes 223(1) to 223(3).

The external volume 223(1) of the first external storage control device 200 (1) corresponds to the logical volume 123(1) and the priority level of the data B stored in the logical volume 123 (1) is "2". Accurately speaking, the logical volume 123 (1) exists virtually and the actual storage of data B is in the external volume 223 (1).

Likewise, the first external volume 223 (2) of the second external storage control device 200(2) corresponds to the logical volume 123 (2) and the priority level of data C stored in the logical volume 123 (1) is "3". The other external volume 223 (3) of the second external storage control device 200 (2) corresponds to the logical volume 123 (3) and the priority level of the data stored in the logical volume 123(3) is "1".

The number of volumes that can be set in the online state in the volume group 130 is assumed to be one. Therefore, the storage control device 100 sets only the logical volume 123 (2) that stores the data of the highest priority level among the three logical volumes 123 (1) to 123 (3) to the online state and sets the logical volumes 123 (1) and 123 (3) to the offline state.

Thus, the storage control device 100 allocates the storage region of the cache memory 113 only to the logical volume 123 (2) in the online state. The storage region of the cache memory 113 is not allocated to the offline-state logical volumes 123 (1) and 123 (3). By allocating the storage region of the cache memory 113 only to the online state logical volume 123 (2), the cache memory 113 can be efficiently used and the costs of the storage control device 100 can be reduced. Further, the resources allocated only to the online state logical volume are not limited to the cache memory 113. However, here, for the sake of expediency in the description, the cache memory 113 will be explained by way of example.

Figure 15B:
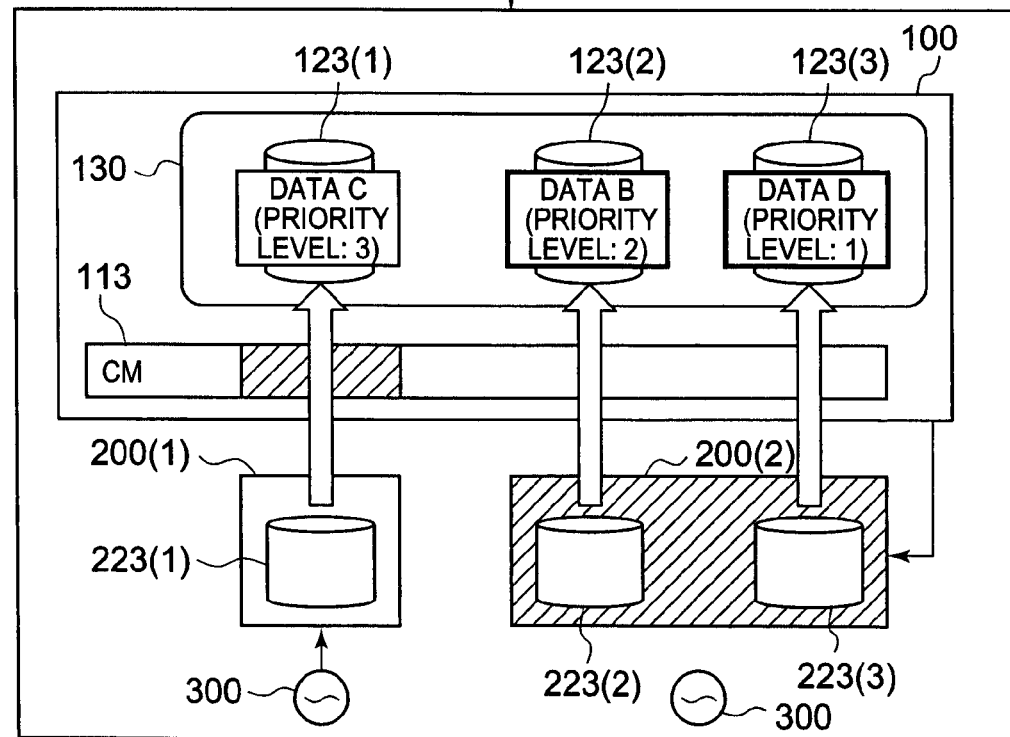

As shown in FIG. 15B, the storage control device 100 sets the logical volumes 123 (2) and 123 (3) to the offline state by switching the storage locations of data B and data C. The switching of the storage destination devices for data B and data C can be implemented by using the temporary volume provided in the other volume group 130. For example, if data B are copied from volume 123 (1) to the temporary volume, data C are copied from volume 123 (2) to volume 123 (1), and data B are copied from the temporary volume to volume 123 (2), data B can be stored in volume 123 (2) and data C can be stored in volume 123 (1).

As a result of switching the storage locations of data B and data C, logical volumes 123 (2) and 123 (3), which are mapped to external volumes 223 (2) and 223 (3) of the second external storage control device 200 (2) are each set to the offline state. Hence, no inconvenience of any kind is produced for the storage system even when the operation of the second external storage control device 200 (2) is stopped. This is because the external volumes 223 (2) and 223 (3) correspond to offline state volumes not used by the host 10.

Therefore, the storage control device 100 stops the supply of power to the second external storage control device 200 (2). As a result, the power consumption of the whole storage system is reduced and the operating costs of the storage system drop.

Figure 16:
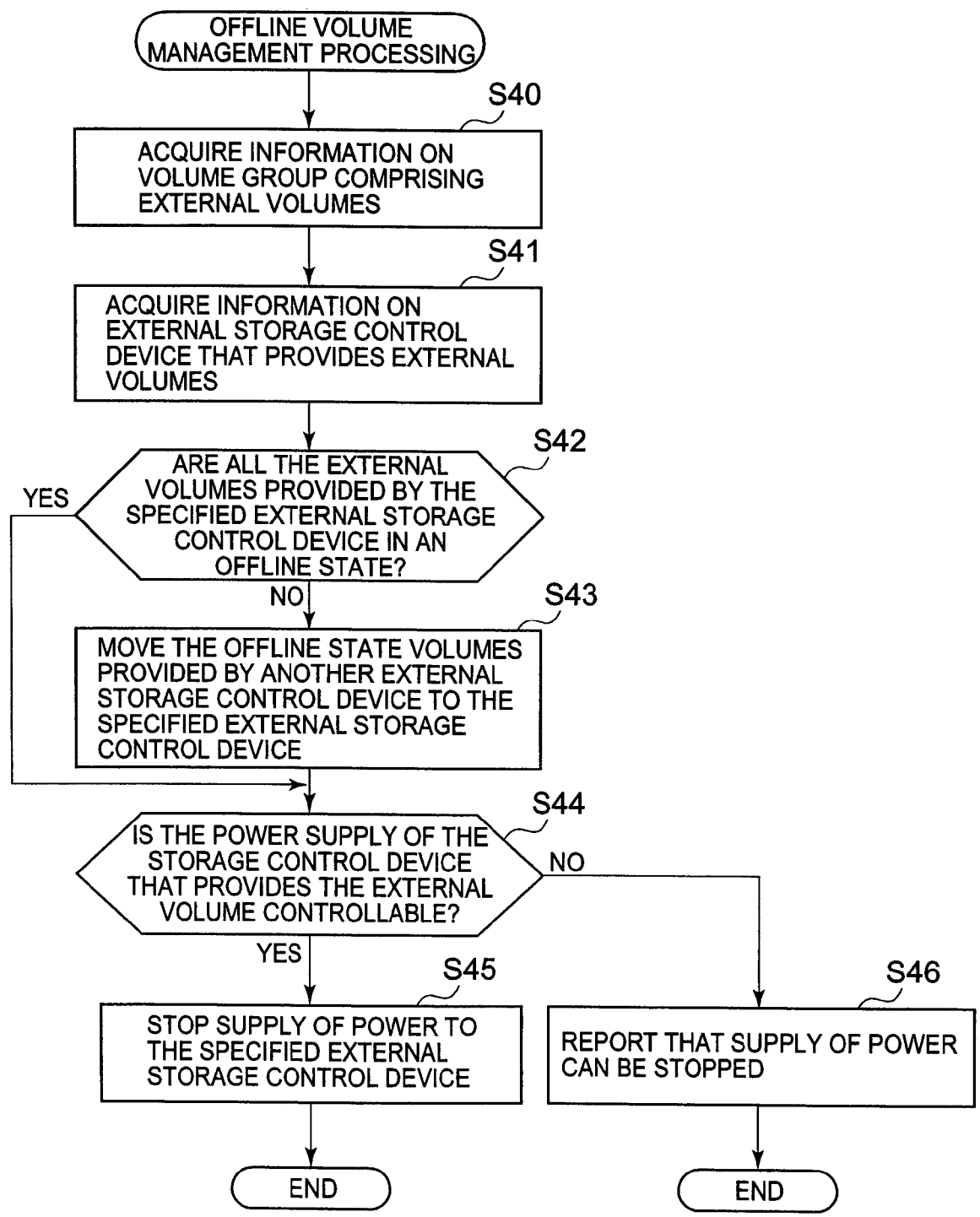
FIG. 16 is a flowchart of processing for managing offline state volumes.
Figure 17:
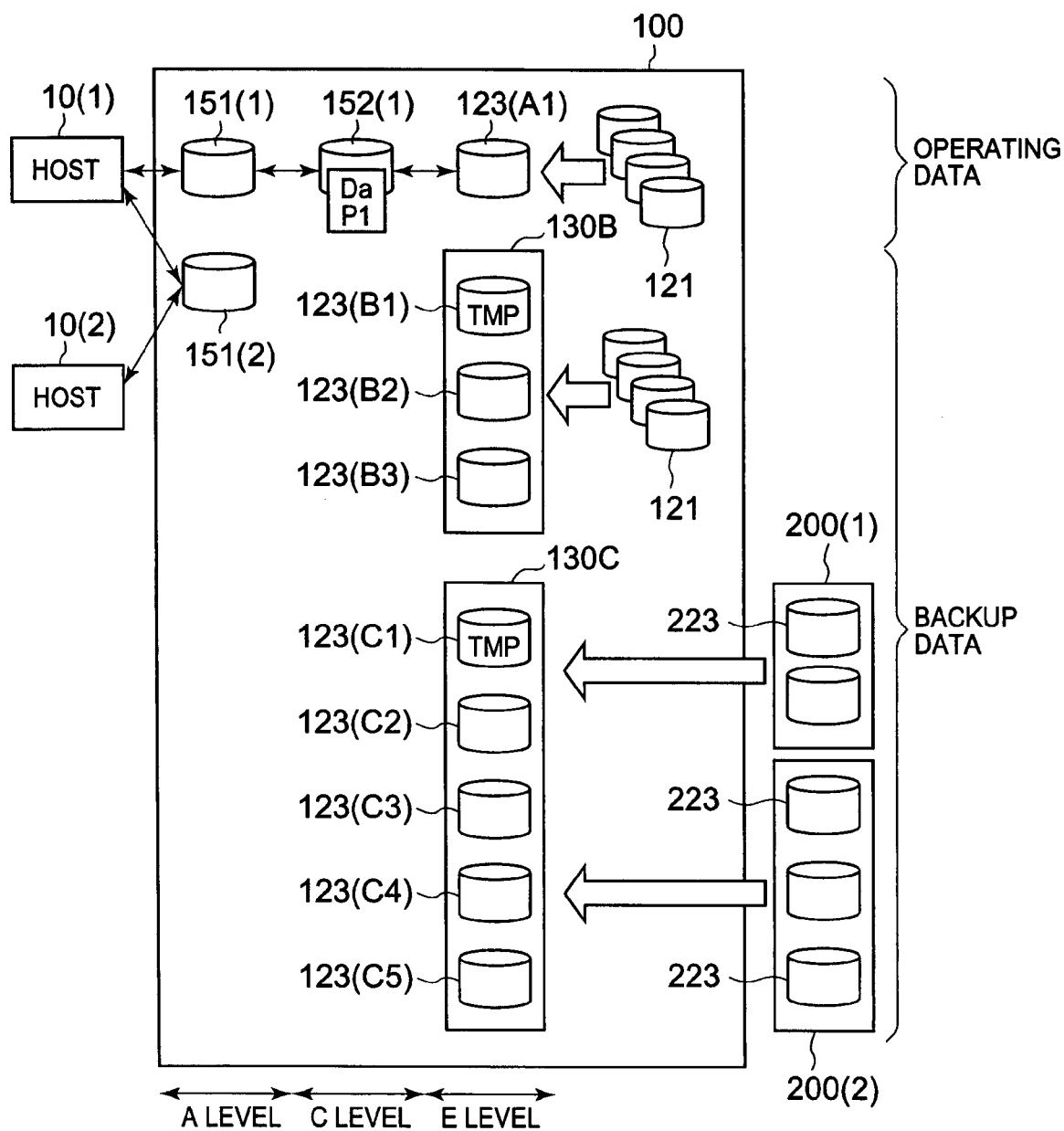
FIG. 17 is an explanatory diagram of an initial state before backup processing of a storage control device according to a third embodiment.

FIG. 16 is a flowchart showing the processing for managing offline-state volumes. The controller 110 acquires information on the volume group 130 constituted by the external volumes 223 of the external storage control devices 200 (S40). Thereafter, the controller 110 acquires information relating to the external storage control devices 200 (S41).

The controller 110 judges whether all the external volumes 223 provided by the specified external storage control devices 200 among the plurality of external storage control devices 200 are in an offline state (S42). More accurately, the controller 110 judges whether the logical volumes 123 corresponding with the respective external volumes 223 of one external storage control device 200 are all in the offline state.

When there is a mixture of online state external volumes 223 and offline state external volumes 223 in the specified external storage control device 200 (S42: NO), as shown in FIG. 15, the controller 110 causes the offline state external volume 223 provided by the other external storage control device 200 to migrate to the specified external storage control device 200 (S43).

That is, more accurately speaking, when the states of the plurality of logical volumes 123 that correspond with the plurality of external volumes 223 in the specified external storage control device 200 are divided into an online state and offline state, the controller 110 changes the data storage destination so that all of the external volumes 223 in the specified external storage control device 200 correspond to the offline state logical volumes 123 (S43).

The controller 110 then judges whether the supply of power to the specified external storage control device 200 can be controlled by the controller 110 (S44). For example, when both the storage control device 100 and the specified external storage control device 200 each comprise an interface or the like for sending and receiving commands and signals and so forth for controlling the supply of power remotely (S44: YES), the supply of power to the specified external storage control device 200 can be automatically stopped by means of a command from the controller 110 (S45).

In contrast, when the supply of power to the specified external storage control device 200 cannot be controlled by an instruction from the controller 110 (S44: NO), the controller 110 informs the user that the supply of power to the specified external storage control device 200 can be stopped via the management terminal 20 (S46).

This embodiment with this constitution also affords the same effects as those of the first embodiment. In addition, in this embodiment, a temporary volume is used to match an offline state logical volume 123 with an external volume 223 in the specified external storage control device 200 and the supply of power to the specified external storage control device 200 can be stopped. Hence, the amount of power consumption of the storage system is reduced and operating costs can be saved.

Third Embodiment

A third embodiment will now be described with respect to FIGS. 17 to 23. In this embodiment, a temporary volume is used to create a backup of the backup-target volume beforehand before a backup instruction is issued.

FIGS. 17 to 22 are explanatory diagrams of an aspect in which backup target data Da which are stored in the primary volume 123 (A1) are backed up automatically and stepwise. The primary volume 123 (A1) used by the host 10 is made to correspond with the access point 151 (1) by means of the management volume 152 (1). The initial priority level of the data (operating data) Da of the backup target is assumed to be "1".

Figure 18:
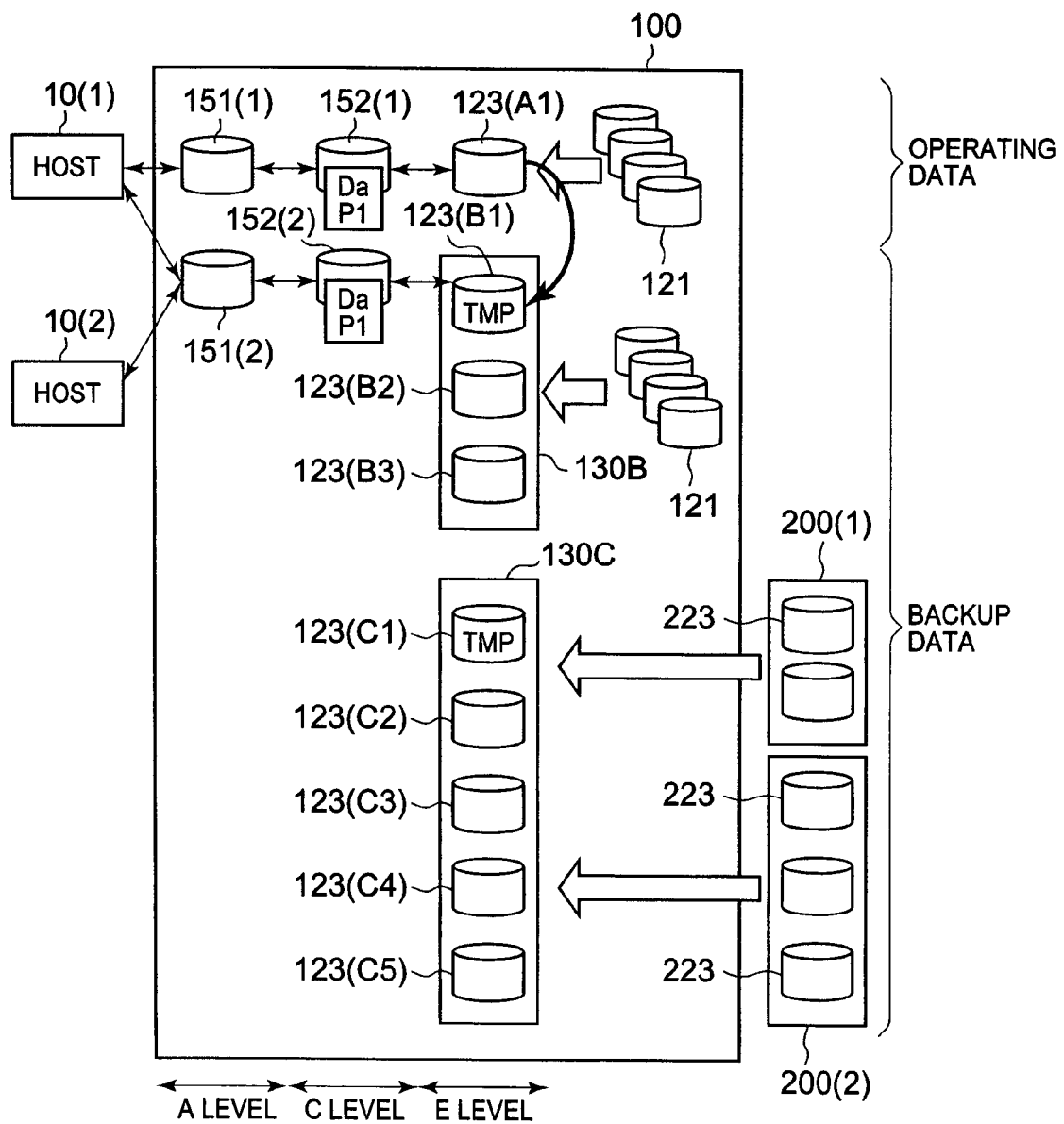
FIG. 18 is an explanatory diagram that follows on from FIG. 17.

As shown in FIG. 18, the controller 110 copies data Da from the primary volume 123 (A1) to temporary volume 123 (B1) provided in lower volume group 130B which is one volume group lower when a time comes when the host 10 is not accessing data Da. The management volume 152(2) for managing the data copied to the temporary volume 123 (B1) then manages the priority level of the data Da copied to the temporary volume 123 (B1). The controller 110 manages the differences between the primary volume 123 (A1) and temporary volume 123 (B1) produced after copying is complete in the primary volume 123 (A1).

Figure 19:
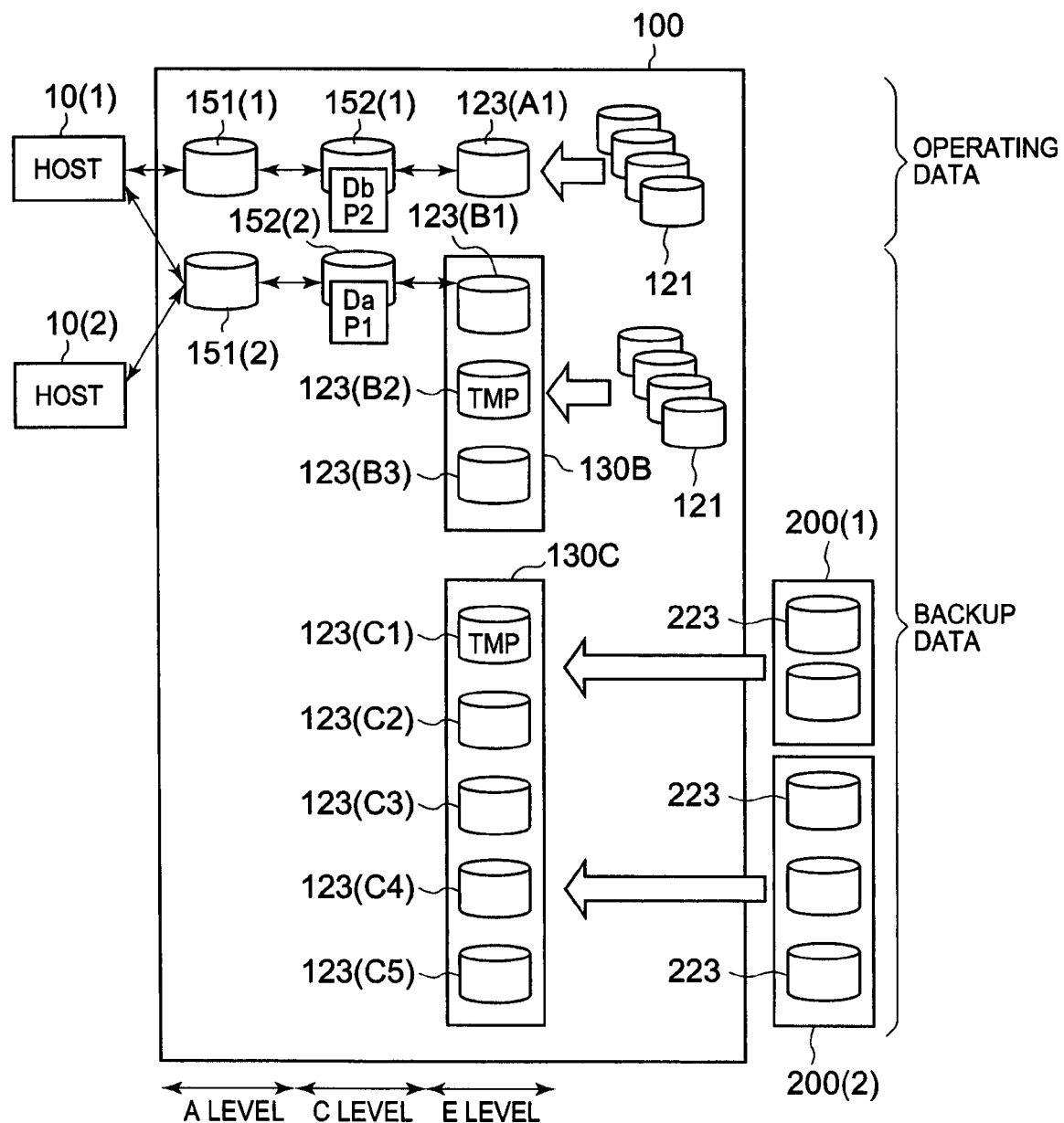
FIG. 19 is an explanatory diagram that follows on from FIG. 18.

As shown in FIG. 19, when backup processing of data Da is started as a result of the backup schedule or an instruction from the user, the controller 110 reflects the differences between the primary volume 123 (A1) and temporary volume 123 (B1) in data Da in the temporary volume 123 (B1). The controller 110 then sets temporary volume 123 (B1) as the device for storing data Da. In other words, based on the subsequent management, the data Da stored in the volume 123 (B1) are treated as real data. As a result, the backup of data Da is complete.

The host 10 uses the primary volume 123 (A1) as is after the backup processing is complete and interrupts the work processing. New operating data Db are stored in the primary volume 123 (A1).

Figure 20:
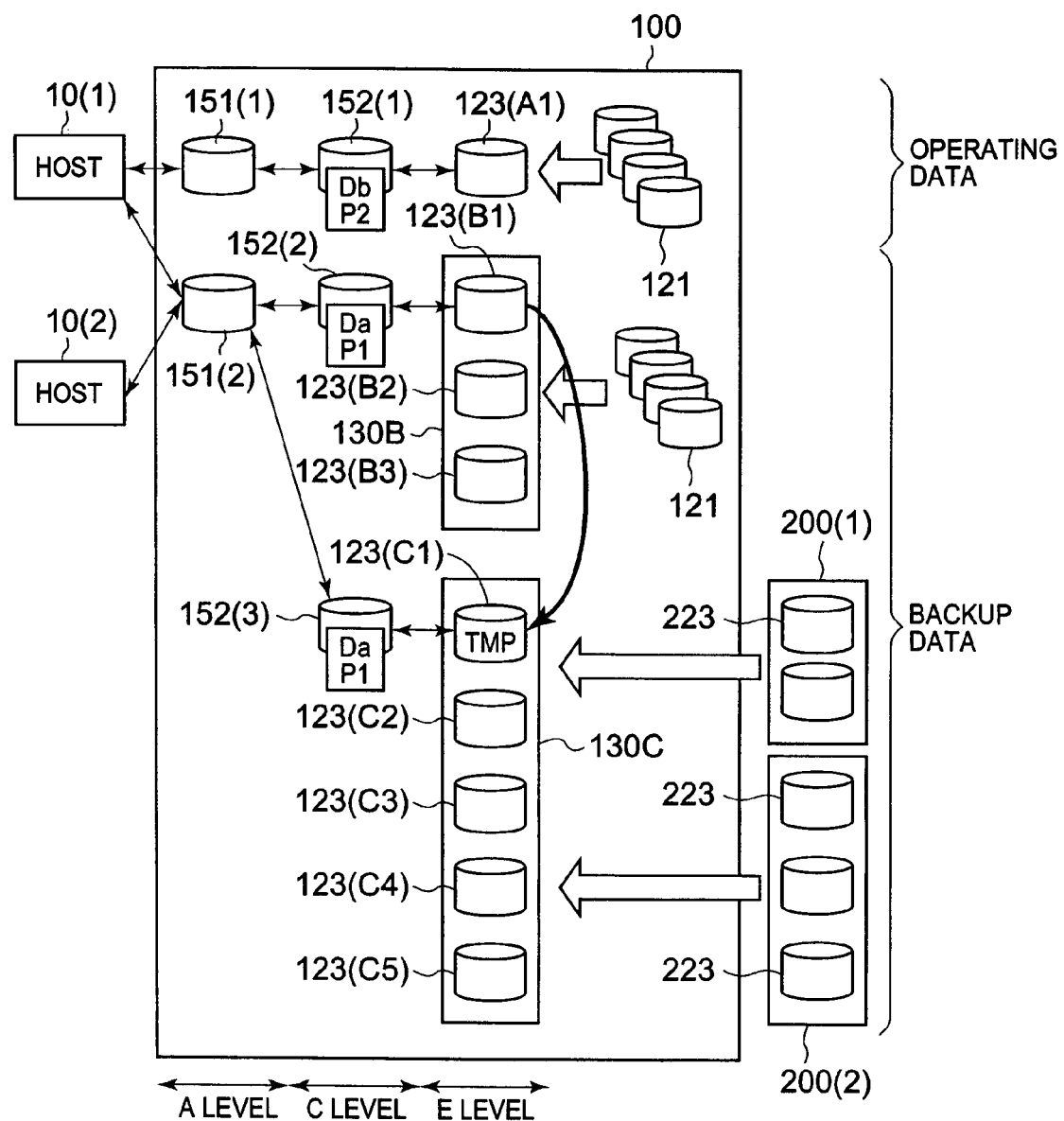
FIG. 20 is an explanatory diagram that follows on from FIG. 19.

As shown in FIG. 20, the data Da which are stored in volume 123 (B1) are backup data and, therefore, the frequency with which these data are accessed by the host 10 is low. Therefore, the priority level of data Da gradually drops lower. Thereafter, as a result of data migration processing, data Da are made to migrate to the temporary volume 123 (C1) in the lower volume group 130C.

Figure 21:
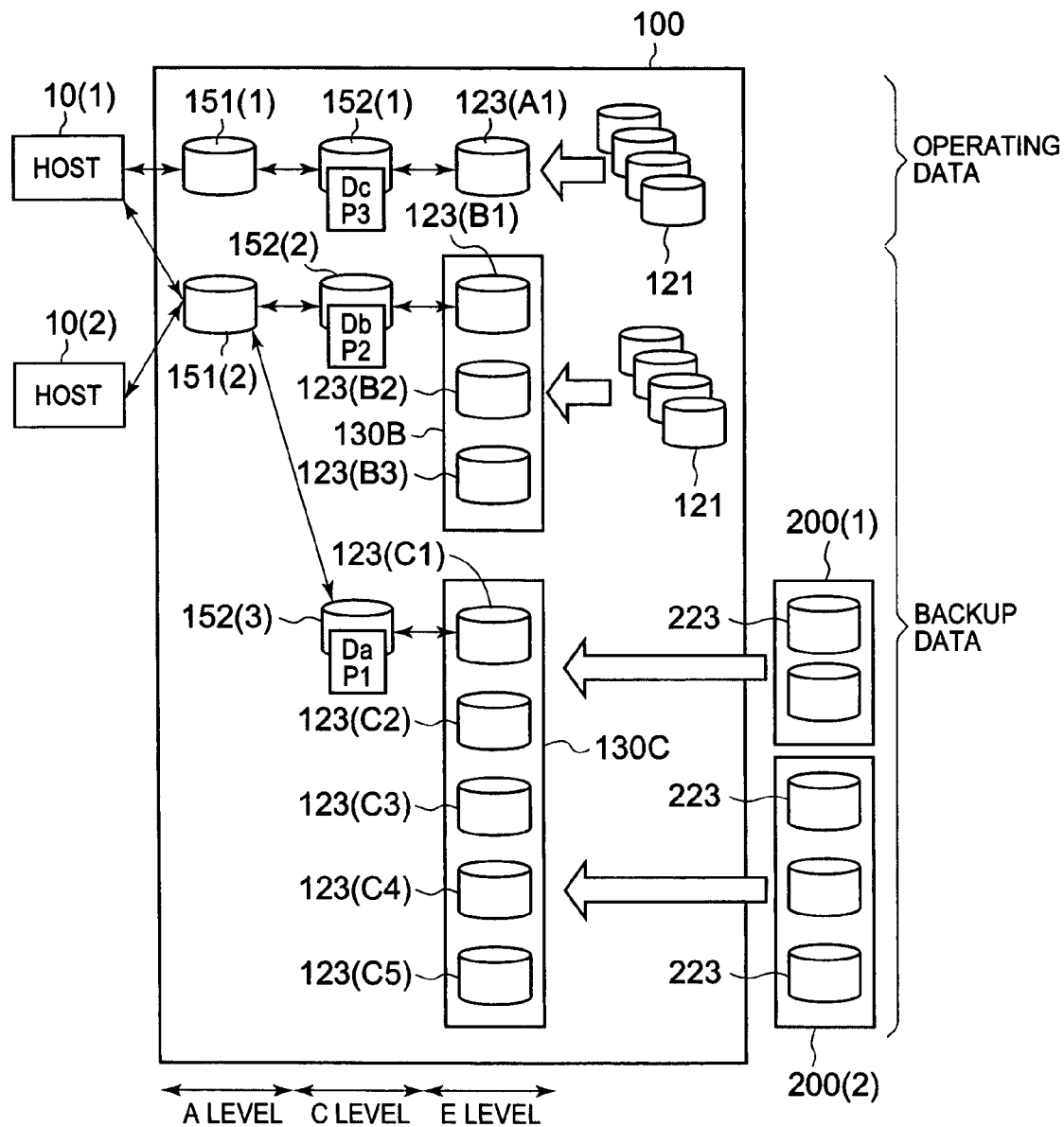
FIG. 21 is an explanatory diagram that follows on from FIG. 20.

As shown in FIG. 21, the new operating data Db are also copied to the temporary volume 123 (B1) in the lower volume group 130B when a time comes when the host 10 is not accessing data Db as illustrated by FIG. 18.

Figure 22:
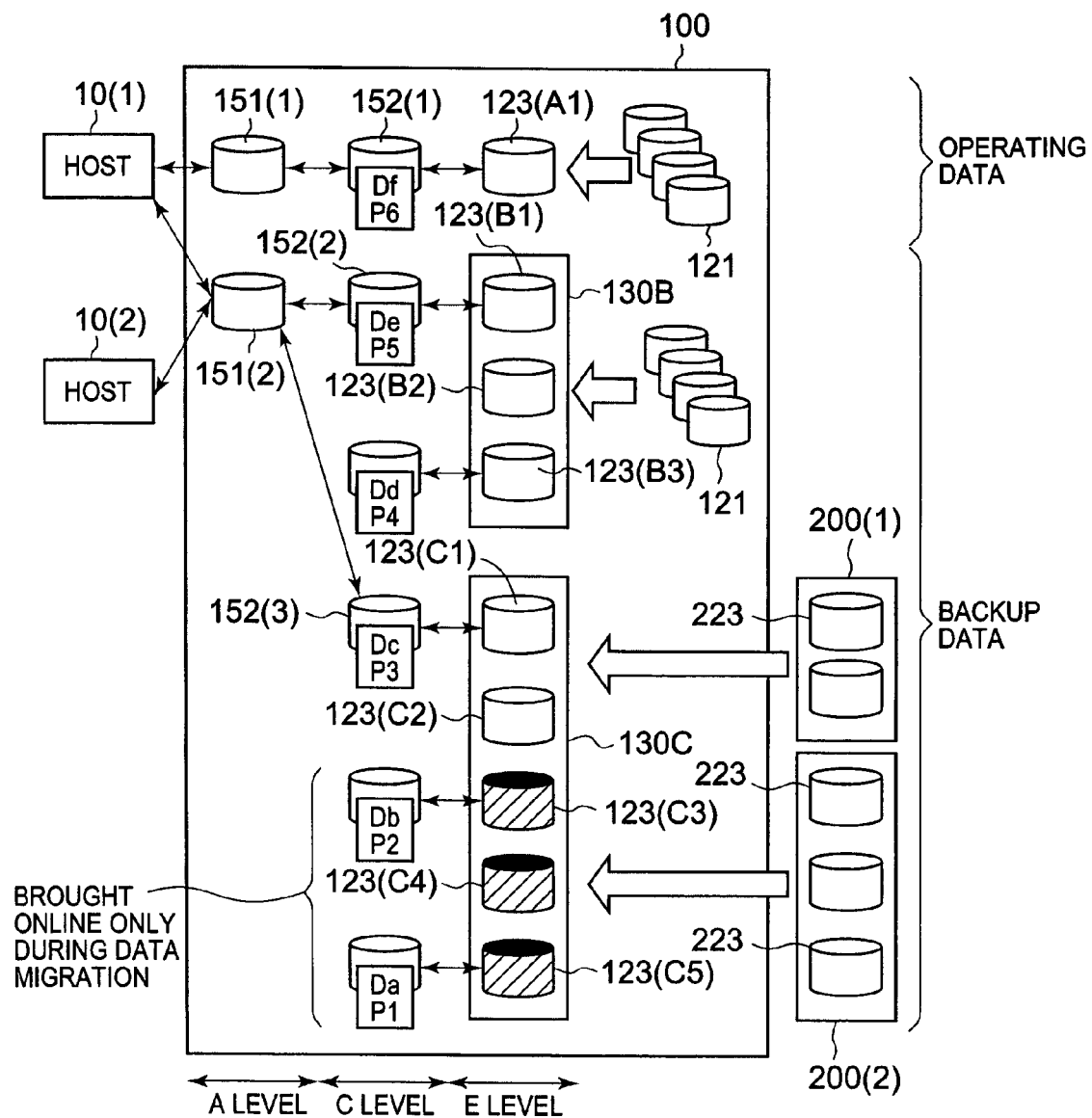
FIG. 22 is an explanatory diagram that follows on from FIG. 21.

As shown in FIG. 22, by repeating the above operation, a backup of data in the primary volume 123 (A1) is created automatically and the older the backup the lower the volume group 130 the data are disposed in.

The host 10 is then able to access backup data of the desired age simply by switching the connection to the access point 151 (2) for accessing the backup data. The backup data of the age desired by the host 10 can be supplied to the host 10 simply by switching the relationship between the access point 151 (2) of the backup data and the management volumes 152 (2) and 152 (3) that manage backup data of the respective ages within the storage control device 100. Furthermore, in FIG. 22, although numerals have only been provided for only two management volumes 152 (1) and 152 (2) due to space constraints, the management volume 152 is prepared for the respective backup data.

Further, the logical volumes 123 (C3), 123 (C4), and 123 (C5) which correspond with the external storage control device 200 (2) in FIG. 22 are each set to offline states. The respective volumes 123 (C3) to 123 (C5) are each set temporarily to the online state only when data are moved.

Figure 23:
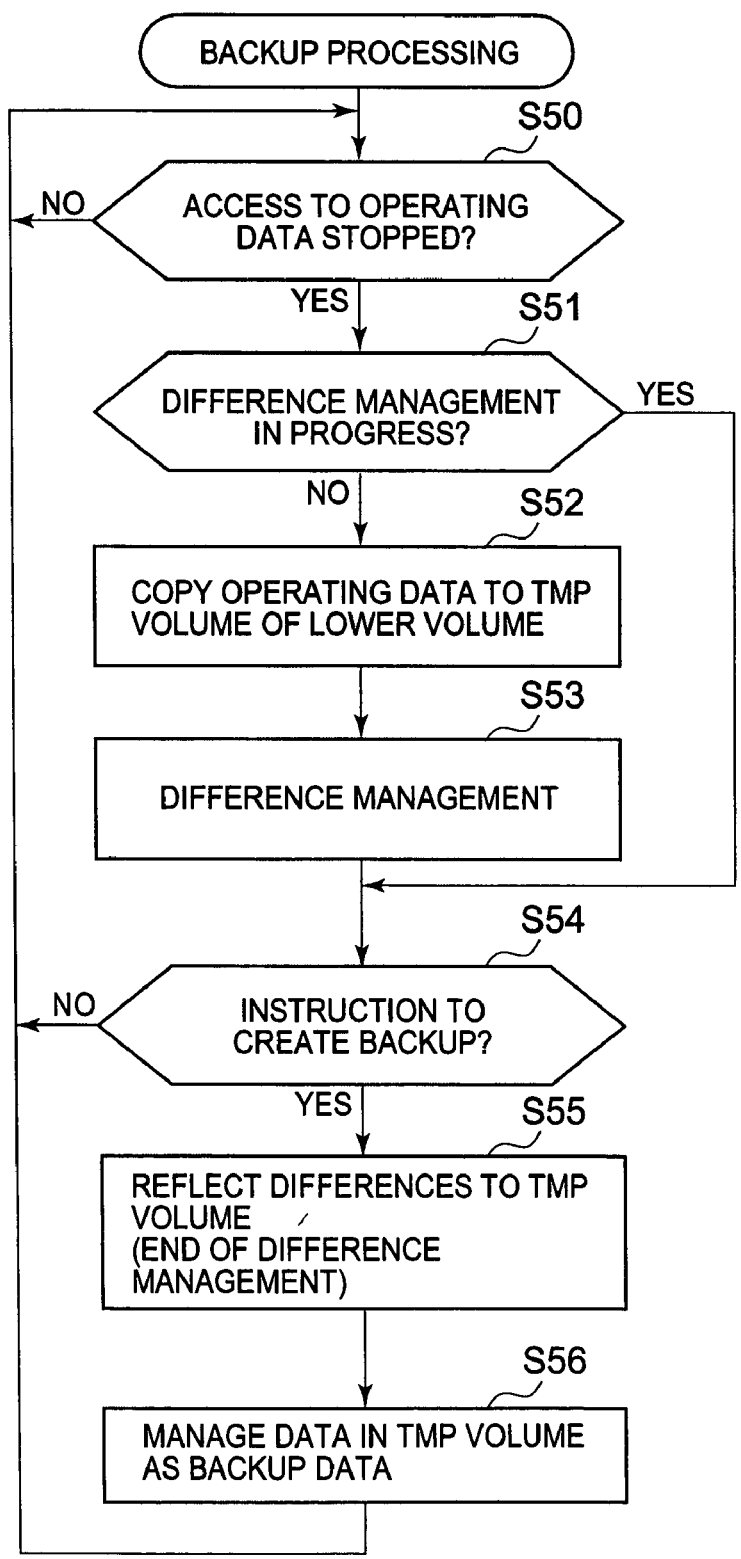
FIG. 23 is a flowchart that shows backup processing.

FIG. 23 is a flowchart showing the above backup processing. The controller 110 judges whether access by the host 10 to the operating data has been interrupted (S50). When access by the host 10 to the operating data has been interrupted (S50: YES), it is judged whether the differences with respect the operating data are being managed (S51). When differences are being managed (S51: YES), data currently being used for the operation have sometimes already been copied to the lower temporary volume. Hence, S52 and S53 below are skipped and the processing moves to S54.

When difference management has not been performed on the operating data (S51: NO), the controller 110 copies the operating data to the temporary volume in the lower volume group (S52) and starts difference processing (S53). A differential bitmap 160, for example, is used in the difference management.

The controller 110 judges whether an instruction to create a backup has been provided (S54). For example, when it is judged, based on the backup schedule, that the backup creation time has arrived, the controller 110 reflects the differences to the temporary volume to which the operating data have been copied (S55). Thereafter, data stored in the temporary volume are managed as backup data of the operating data (S56). As a result, the backup processing of the operating data ends.

The embodiment with this constitution also affords the same results as those for the first embodiment. In addition, in this embodiment, a backup of the operating data can be created automatically by using the temporary volume and user convenience improves. Further, because the operating data are copied to the temporary volume beforehand, a backup of the operating data can be created rapidly simply by writing the differences produced after copying to the temporary volume. Hence, the backup time can be shortened and user convenience can be improved.

Fourth Embodiment

Figure 24:
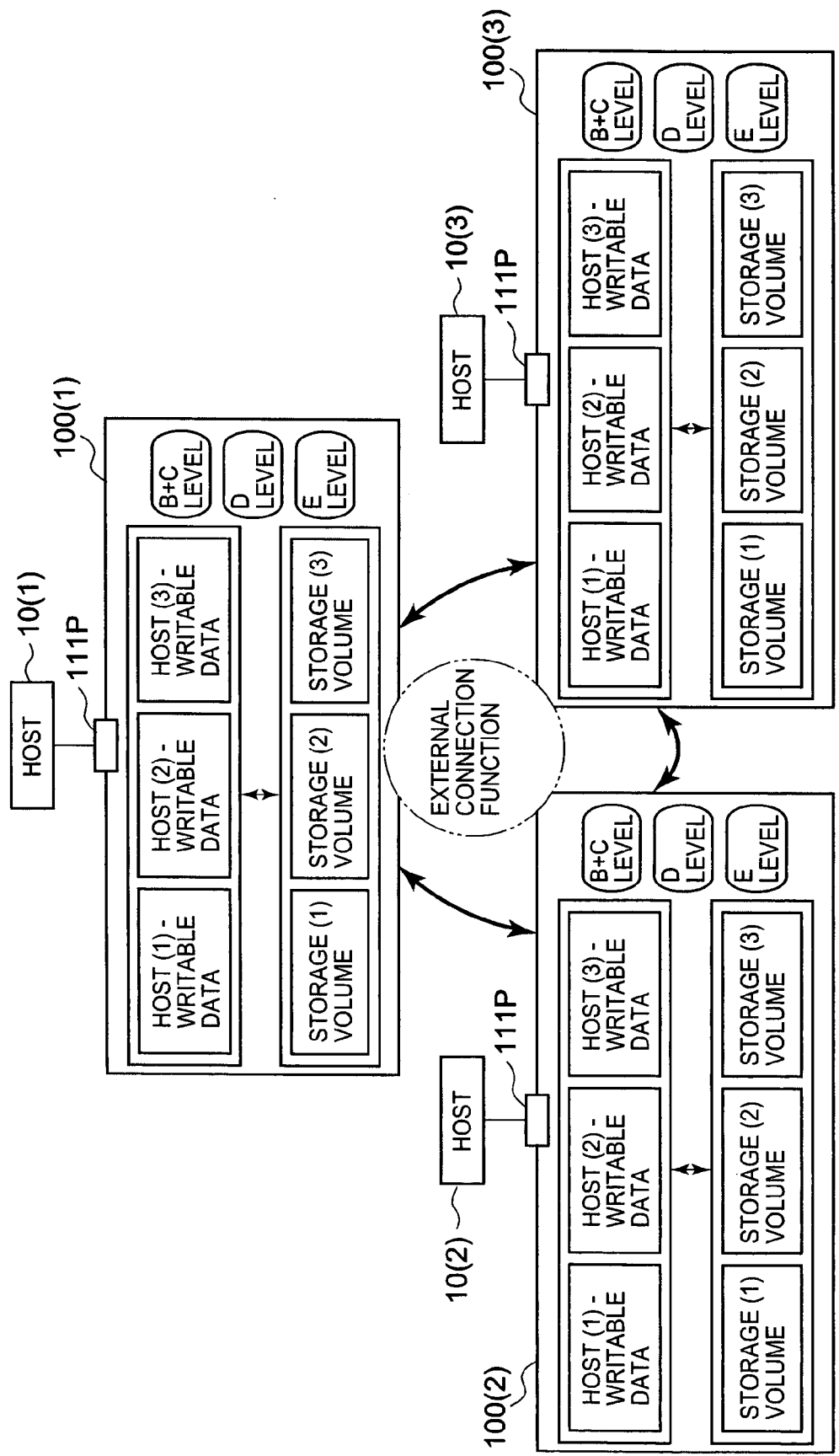
FIG. 24 is an explanatory diagram of the overall constitution of a storage system in which the storage control device according to a fourth embodiment is used.

A fourth embodiment will now be described based on FIG. 24. In this embodiment, a plurality of storage control devices 100 (1), 100 (2), and 100 (3) are mutually connected using an external connection function and the volumes that the respective storage control devices 100 (1) to 100 (3) comprise are each managed on level E of the respective storage control devices 100 (1) to 100 (3). Further, due to space constraints in FIG. 24, 'storage control device' is displayed as 'storage'. 'Storage (1)' in FIG. 24 denotes the storage control device 100 (1), 'storage (2)' denotes 'storage control device 100 (2)', and 'storage (3)' denotes 'storage control device 100 (3). Likewise, 'host (1)' denotes host 10 (1), 'host (2)' denotes host 10 (2), and 'host (3)' denotes host 10 (3).

The external connection function is a function whereby one storage control device incorporates the volumes of another storage control device as if the volumes of the other storage control device were its own volumes as was mentioned earlier with regard to the storage control device 100 and external storage control device 200. By creating virtual volumes that are mapped to the other storage control devices among the respective storage control devices 100 (1) to 100 (3), the respective storage control devices are able to incorporate and use volumes of the other storage control device.

The respective storage control devices 100 (1) to 100 (3) are each managed using the respective data on level B and C and limits are set for the hosts capable of updating the respective data. That is, update-related constraints are set so that data are not updated by a host other than a host that has been permitted beforehand. Further, the respective hosts 10 (1) to 10 (3) are set so that all the data can be read.

Data migration processing is performed so that the respective data in the storage system are disposed in the storage control devices connected to the host with the highest access frequency among the respective storage control devices 100 (1) to 100 (3).

Moreover, the present invention is not limited to the above embodiments. A person skilled in the art is able to perform a variety of additions and modifications and so forth within the scope of the present invention.

What is claimed is:

1. A storage control device that comprises a plurality of storage drives for storing data used by a higher level device and a controller that controls data inputs and outputs between each of the storage drives and the higher level device, comprising:

a plurality of logical volumes formed on the basis of physical storage regions of the respective storage drives;

a plurality of volume groups each formed by grouping a plurality of each of the respective logical volumes;

a priority level management section that is provided in the controller and that detects and manages each of the priority levels of the data stored in the respective logical volumes on the basis of an access request issued by the higher level device; and a data migration section provided in the controller that moves the data between the respective volume groups on the basis of the respective priority levels managed by the priority level management section, wherein, among the respective logical volumes in the respective volume groups, at least one or more of the logical volumes is established as a temporary volume which is used for the migration of the data;

wherein the respective storage drives are classified as storage drives of a plurality of types each of which has a different performance, and the respective volume groups are ranked from a volume group with the highest rank to a volume group with the lowest rank in accordance with the type of the storage drive in which the respective logical volumes constituting the respective volume groups are provided, and wherein the data migration section selects data with the highest priority level among the respective data contained in a migration source volume group of a relatively low rank as the migration target data and copies the migration target data beforehand to the temporary volume contained in a migration destination volume group that is one rank higher, wherein the data migration section uses the temporary volume to move the migration target data between the respective volume groups before the migration destination of the migration target data has been determined.

2. The storage control device according to claim 1, wherein the respective volume groups are ranked in accordance with the types of the respective logical volumes that constitute the respective volume groups.

3. The storage control device according to claim 2, wherein the data migration section uses the temporary volume to move the migration target data between the respective volume groups so that the data of a high priority level are located in a volume group of a higher rank and data of a low priority level are located in a volume group of a lower rank.

4. The storage control device according to claim 1, wherein the priority level management section detects and manages the priority levels of each of the data on the basis of the last time the higher level device accessed the respective data and the frequency with which the higher level device has accessed the respective data.

5. The storage control device according to claim 1, wherein the priority level management section detects and manages the priority level for each of the respective data on the basis of the last time the higher level device accessed the respective data, the frequency with which the higher level device has accessed the respective data, and a priority level hold time that is preset for the respective data.

6. The storage control device according to claim 1, wherein the data migration section uses the migration target data copied to the temporary volume in the migration destination volume group to process an access request issued by the higher level device to the migration target data.

7. The storage control device according to claim 6, wherein the data migration section manages the differences between the temporary volume in the migration destination volume group and a migration source logical volume in the migration source volume group with respect to the migration target data.

8. The storage control device according to claim 7, wherein the data migration section reflects the differences in the migration source logical volume when the priority level of the migration target data is lowered by the priority level management section and copies other data set at the highest priority level in the migration source volume group to the temporary volume in the migration destination volume group.

9. The storage control device according to claim 1, wherein the data migration section copies beforehand backup target data stored in a backup target logical volume that exists in a higher ranking volume group to a temporary volume in a lower ranking volume group.

10. The storage control device according to claim 9, wherein the data migration section manages differences between the backup target logical volume and the temporary volume in the lower ranking volume group with respect to the backup target data and ends the backup by reflecting the differences in the temporary volume when an instruction to execute a backup is issued.

11. The storage control device according to claim 1, wherein the controller controls each of (1) an access path management level that manages access points accessed by the higher level device, (2) a volume management level that manages the respective logical volumes, (3) an intermediate management level that manages management information related to the data stored in the volume management level and associations between the access points and the logical volumes.

12. The storage control device according to claim 11, wherein the intermediate management level is constituted comprising a first level that manages the management information, a second level that manages the relationship between the access points and the first level, and a third level that manages the association between the first level and the volume management level.

13. The storage control device according to claim 1, wherein at least one specified volume group among the respective volume groups is constituted by a virtual logical volume that is associated with another logical volume that exists in a plurality of different storage control devices; and the controller allocates cache memory in the controller when the virtual logical volume has been set to the online state and does not allocate the cache memory when the virtual logical volume has been set to the offline state.

14. The storage control device according to claim 13, wherein the controller stores low priority level data in the specified virtual logical volumes associated with the other logical volumes in the specified other storage control device and, when the specified virtual logical volumes have all been set to the offline state, reports the fact that the supply of power to the specified other storage control device can be stopped or automatically stops the supply of power to the specified other storage control device.

15. A data migration method that uses a storage control device that comprises a plurality of storage drives for storing data used by a higher level device and a controller that controls data inputs and outputs between each of the storage drives and the higher level device,
wherein the controller executes:
a step of generating each of a plurality of volume groups by grouping a plurality of each of a plurality of logical volumes formed on the basis of the physical storage regions of the respective storage drives according to the performance of the respective storage drives and setting at least one or more logical volumes among the respective logical volumes in the respective volume groups as a temporary volume for moving data;
a step of detecting and managing each of a plurality of priority levels of the data stored in the respective logical volumes on the basis of an access request issued by the higher level device;
a step of classifying the respective storage drives as storage drives of a plurality of types each of which has a different performance, and ranking the respective volume groups from a volume group with the highest rank to a volume group with the lowest rank in accordance with the type of the storage drive in which the respective logical volumes constituting the respective volume groups are provided; and
a step of selecting data with the highest priority level among the respective data contained in a migration source volume group of a relatively low rank as the migration target data and copying the migration target data beforehand to the temporary volume contained in a migration destination volume group that is one rank higher,
a step of using the temporary volume to move migration target data between the respective volume groups before data migration is determined so that the high priority level data are stored in a volume group associated with a higher performance storage drive and the low priority level data are stored in a volume group associated with a lower performance storage drive.

* * * * *